United States Patent
Samuel et al.

(10) Patent No.: US 10,017,248 B2
(45) Date of Patent: Jul. 10, 2018

(54) FLAPPING WING AERIAL VEHICLES

(71) Applicants: Daedalus Flight Systems, LLC, Rockville, MD (US); University of Maryland, College Park, College Park, MD (US)

(72) Inventors: Paul D. Samuel, Rockville, MD (US); Imraan Faruque, Charlottesville, VA (US); James Sean Humbert, San Francisco, CA (US)

(73) Assignees: University of Maryland, College Park, College Park, MD (US); Daedalus Flight Systems, LLC, Rockville, MD (US)

( * ) Notice: Subject to any disclaimer, the term of this patent is extended or adjusted under 35 U.S.C. 154(b) by 339 days.

(21) Appl. No.: 14/698,375

(22) Filed: Apr. 28, 2015

(65) Prior Publication Data
US 2015/0307191 A1    Oct. 29, 2015

Related U.S. Application Data

(60) Provisional application No. 61/984,892, filed on Apr. 28, 2014.

(51) Int. Cl.
*B64C 33/00*    (2006.01)
*B64C 33/02*    (2006.01)
*B64C 39/02*    (2006.01)

(52) U.S. Cl.
CPC ............ *B64C 33/02* (2013.01); *B64C 39/024* (2013.01); *B64C 2201/025* (2013.01)

(58) Field of Classification Search
CPC .. B64C 2201/025; B64C 33/02; B64C 39/024; B64C 39/028; B64C 33/00; B64C 33/025; Y10T 74/18968; Y10T 74/18928
See application file for complete search history.

(56) References Cited

U.S. PATENT DOCUMENTS 792,154 A  *  6/1905  McMullen .............. B64C 33/02
                                                        244/22
920,792 A  *  5/1909  Uherkocz .............. B64C 33/02
                                                        244/22

(Continued)

OTHER PUBLICATIONS

Barrett el al., "Post-buckled precompressed subsonic micro-flight control actuators and surfaces," *Smart Materials and Structures*, 2008, 17(055011).

(Continued)

*Primary Examiner* — Medhat Badawi
(74) *Attorney, Agent, or Firm* — Shapiro, Gabor and Rosenberger, PLLC

(57) ABSTRACT

An autonomous flapping wing aerial vehicle can have a vehicle body, a pair of flapping wings, tunable wing hinges, and elastic drive mechanisms. The tunable wing hinges can be coupled to the flapping wings. Each wing hinge can be constructed to deliver a force to a respective one of the flapping wings to alter end points of a stroke thereof. The elastic drive mechanisms can rotate the flapping wings about pivot points to produce the strokes of the flapping wings. The elastic drive mechanism can be driven at or near a resonance thereof. Alterations to the strokes of the flapping wings produced by the combined effect of the tunable wing hinges and the elastic drive mechanisms, operating in parallel, can provide steering control of the aerial vehicle.

20 Claims, 13 Drawing Sheets

(56) References Cited

U.S. PATENT DOCUMENTS

| | | | | |
|---|---|---|---|---|
| 980,840 A * | 1/1911 | Rozboril et al. | B64C 33/02 | 244/72 |
| 1,117,585 A * | 11/1914 | Marschall | B64C 33/02 | 244/22 |
| 1,364,174 A * | 1/1921 | Bird | B64C 33/00 | 244/22 |
| 1,375,297 A * | 4/1921 | Jurek | B64C 33/02 | 244/22 |
| 1,450,480 A * | 4/1923 | Buck | B64C 33/02 | 244/22 |
| 1,525,565 A * | 2/1925 | Bean | B64C 33/00 | 244/22 |
| 1,980,002 A * | 11/1934 | Savidge | B64C 33/00 | 244/11 |
| 2,017,534 A * | 10/1935 | Gray | B64C 33/02 | 244/22 |
| 2,218,599 A * | 10/1940 | Brunner | B64C 33/02 | 244/72 |
| 2,295,306 A * | 9/1942 | Tampier | B64C 13/00 | 244/215 |
| 2,418,569 A * | 4/1947 | Baumann | B64C 33/02 | 244/22 |
| 2,517,282 A * | 8/1950 | Bruel | B64C 27/54 | 416/117 |
| 2,584,663 A * | 2/1952 | Bensen | B64C 27/46 | 416/147 |
| 2,976,739 A * | 3/1961 | Lewellen | F16H 55/56 | 474/42 |
| 3,085,355 A * | 4/1963 | Carpenter | G09B 9/18 | 434/54 |
| 3,132,620 A * | 5/1964 | Court | B63H 9/1042 | 114/106 |
| 3,161,376 A * | 12/1964 | Lyle | B64C 33/00 | 244/20 |
| 3,191,889 A * | 6/1965 | Roberts | B64C 23/005 | 244/62 |
| 3,232,348 A * | 2/1966 | Jarosch | B64C 27/54 | 416/105 |
| 3,289,770 A * | 12/1966 | Derschmidt | B64C 27/001 | 416/102 |
| 3,508,840 A * | 4/1970 | Lederlin | B63H 1/36 | 416/1 |
| 3,728,814 A * | 4/1973 | Ruston | A63H 27/008 | 446/35 |
| 4,053,122 A * | 10/1977 | Gar | B64C 33/02 | 244/11 |
| 4,155,195 A * | 5/1979 | Leigh-Hunt | A63H 27/008 | 244/11 |
| 4,428,550 A * | 1/1984 | Evans | B64C 13/30 | 244/220 |
| 4,749,149 A * | 6/1988 | Gruich | B64C 33/02 | 244/11 |
| 4,793,573 A * | 12/1988 | Kelfer | B64C 33/02 | 244/11 |
| 5,163,861 A * | 11/1992 | Van Ruymbeke | A63H 27/008 | 244/11 |
| 5,170,965 A * | 12/1992 | Yasuda | B64C 33/02 | 244/11 |
| 5,899,408 A * | 5/1999 | Bowers, Jr. | B64C 33/02 | 244/11 |
| 5,915,650 A * | 6/1999 | Petrovich | B64C 3/38 | 244/38 |
| 5,938,150 A * | 8/1999 | King | A63H 27/08 | 244/153 R |
| 6,012,962 A * | 1/2000 | Arriola | A63H 3/20 | 446/330 |
| 6,082,671 A * | 7/2000 | Michelson | B64C 39/028 | 244/72 |
| 6,206,324 B1 * | 3/2001 | Smith | B64C 33/02 | 244/72 |
| 6,227,483 B1 * | 5/2001 | Therriault | B64C 33/02 | 244/20 |
| 6,530,540 B1 * | 3/2003 | Chen | B64C 33/00 | 244/11 |
| 6,540,177 B2 * | 4/2003 | Woo | B64C 33/00 | 244/11 |
| 6,565,039 B2 * | 5/2003 | Smith | B64C 33/025 | 244/72 |
| 6,659,397 B1 * | 12/2003 | Charron | B64C 33/02 | 244/195 |
| 6,769,949 B2 * | 8/2004 | Kim | A63H 27/008 | 244/11 |
| 6,783,097 B1 * | 8/2004 | Smith | B64C 33/02 | 244/11 |
| 6,840,476 B1 * | 1/2005 | Raney | B64C 33/02 | 244/11 |
| 6,959,895 B2 * | 11/2005 | Cylinder | B64C 33/02 | 244/11 |
| 7,007,889 B2 * | 3/2006 | Charron | B64C 31/02 | 244/123.9 |
| 7,036,769 B2 * | 5/2006 | Wood | B64C 33/02 | 244/11 |
| 7,107,842 B2 * | 9/2006 | Wu | G01C 19/56 | 244/22 |
| 7,195,199 B2 * | 3/2007 | Ohta | B64C 33/02 | 244/11 |
| 7,219,855 B2 * | 5/2007 | Hamamoto | B64C 33/02 | 244/72 |
| 7,331,546 B2 * | 2/2008 | Ifju | A63H 27/007 | 244/123.1 |
| 7,341,222 B1 * | 3/2008 | Reuel | B64C 39/028 | 244/11 |
| 7,350,745 B2 * | 4/2008 | Livingston | B64C 33/02 | 244/22 |
| 7,607,610 B1 * | 10/2009 | Sterchak | B64C 33/02 | 244/11 |
| 7,937,881 B2 * | 5/2011 | Price | A01M 31/06 | 43/3 |
| 7,954,769 B2 * | 6/2011 | Bushnell | B64C 9/02 | 244/204 |
| 8,033,499 B2 * | 10/2011 | Yang | A63H 27/008 | 244/22 |
| 8,070,090 B2 * | 12/2011 | Tayman | B64C 27/24 | 244/6 |
| 8,167,234 B1 * | 5/2012 | Moore | B64C 37/00 | 244/17.23 |
| 8,181,907 B2 * | 5/2012 | Smith | B64C 33/02 | 244/11 |
| 8,210,470 B2 * | 7/2012 | Ohta | B64C 33/00 | 244/22 |
| 8,333,342 B2 * | 12/2012 | Martinelli | B64C 33/02 | 244/11 |
| 8,382,546 B2 * | 2/2013 | Van Ruymbeke | A63H 27/008 | 244/11 |
| 8,395,298 B2 * | 3/2013 | Rossman | G21H 1/02 | 310/305 |
| 8,700,233 B1 * | 4/2014 | Doman | B64C 33/02 | 244/11 |
| 8,800,936 B2 * | 8/2014 | Cowley | B64C 11/002 | 244/110 B |
| 9,016,621 B2 * | 4/2015 | Zachary | B64C 33/02 | 244/72 |
| 9,072,981 B2 * | 7/2015 | Tanous | A63H 27/008 | |
| 9,216,823 B2 * | 12/2015 | Matte | B64C 33/02 | |
| 9,258,993 B2 * | 2/2016 | Szechenyi | F16H 21/44 | |
| 9,272,783 B2 * | 3/2016 | Pearson | B64C 39/024 | |
| 9,428,269 B1 * | 8/2016 | Oppenheimer | B64C 33/025 | |
| 9,669,925 B2 * | 6/2017 | Keennon | B64C 39/003 | |
| 2001/0019088 A1 * | 9/2001 | Smith | B64C 33/02 | 244/17.13 |
| 2002/0117583 A1 * | 8/2002 | Hamamoto | B64C 33/02 | 244/72 |
| 2003/0039489 A1 * | 2/2003 | Obrien | G03G 15/165 | 399/316 |
| 2003/0054724 A1 * | 3/2003 | Tomas | A63H 27/008 | 446/35 |
| 2003/0057332 A1 * | 3/2003 | Schwetzler | B64C 9/18 | 244/203 |

(56) References Cited

U.S. PATENT DOCUMENTS

| | | | |
|---|---|---|---|
| 2003/0226933 A1* | 12/2003 | Richard | B64C 33/00 244/11 |
| 2003/0230672 A1* | 12/2003 | Charron | B64C 33/02 244/72 |
| 2004/0056149 A1* | 3/2004 | Pines | B64C 33/02 244/11 |
| 2004/0140404 A1* | 7/2004 | Ohta | B64C 33/00 244/190 |
| 2004/0195436 A1* | 10/2004 | Sinclair | A63H 27/008 244/49 |
| 2004/0195439 A1* | 10/2004 | Hamamoto | B64C 33/02 244/72 |
| 2005/0001091 A1* | 1/2005 | Raney | B64C 33/02 244/11 |
| 2005/0230522 A1* | 10/2005 | Smith | B64C 33/02 244/22 |
| 2005/0269447 A1* | 12/2005 | Chronister | B64C 33/02 244/72 |
| 2005/0274847 A1* | 12/2005 | Charron | B64C 31/02 244/123.1 |
| 2006/0006280 A1* | 1/2006 | Wood | B64C 33/02 244/72 |
| 2006/0060698 A1* | 3/2006 | Ohta | B64C 33/00 244/72 |
| 2006/0102782 A1* | 5/2006 | Earl | B64C 33/02 244/72 |
| 2006/0180953 A1* | 8/2006 | Wood | H01L 41/333 264/328.1 |
| 2006/0181179 A1* | 8/2006 | Wood | H01L 41/094 310/367 |
| 2006/0259019 A1* | 11/2006 | Sanchez | A61B 19/2203 606/1 |
| 2007/0138339 A1* | 6/2007 | Sinclair | A63H 27/008 244/72 |
| 2007/0157864 A1* | 7/2007 | Aldin | B63B 1/107 114/281 |
| 2007/0205322 A1* | 9/2007 | Liao | B64C 33/02 244/22 |
| 2007/0210207 A1* | 9/2007 | Liao | B64C 33/02 244/22 |
| 2007/0262194 A1* | 11/2007 | Agrawal | B64C 33/02 244/11 |
| 2008/0191100 A1* | 8/2008 | Muren | A63H 27/008 244/201 |
| 2008/0251632 A1* | 10/2008 | Kim | B64C 33/02 244/22 |
| 2010/0288871 A1* | 11/2010 | Hwang | A63H 27/008 244/22 |
| 2010/0308158 A1* | 12/2010 | Park | B64C 33/02 244/22 |
| 2010/0308160 A1* | 12/2010 | Keennon | B64C 33/02 244/22 |
| 2010/0308178 A1* | 12/2010 | Gemmati | B64C 13/28 244/230 |
| 2011/0278391 A1* | 11/2011 | Kotler | B64C 33/02 244/22 |
| 2012/0248243 A1* | 10/2012 | Greenyer | B64C 33/02 244/72 |
| 2012/0292438 A1* | 11/2012 | Sreetharan | B64C 33/02 244/72 |
| 2013/0320133 A1* | 12/2013 | Ratti | B64C 33/02 244/22 |
| 2014/0061379 A1* | 3/2014 | Campolo | B64C 39/028 244/72 |
| 2014/0158821 A1* | 6/2014 | Keennon | B64C 33/02 244/72 |
| 2015/0210389 A1* | 7/2015 | Murdock | B64C 33/025 244/22 |
| 2015/0232179 A1* | 8/2015 | Smith | B64C 33/02 244/72 |
| 2015/0307191 A1* | 10/2015 | Samuel | B64C 33/02 244/22 |
| 2016/0068263 A1* | 3/2016 | Ristroph | B64C 33/02 244/22 |
| 2016/0083112 A1* | 3/2016 | Criado | B64C 39/024 244/63 |
| 2016/0159477 A1* | 6/2016 | Deng | B64C 33/02 244/22 |
| 2016/0185455 A1* | 6/2016 | Deng | B60L 1/00 310/38 |

OTHER PUBLICATIONS

Cheng et al., "Aerodynamic damping during rapid flight maneuvers in the fruit fly *Drosophila*," *Journal of Experimental Biology*, 2010, 213: pp. 602-612.

Faruque el al., "Dipteran insect flight dynamics. Part 1: Longitudinal motion about hover," *Journal of Theoretical Biology*, 2010, 264: pp. 538-552.

Faruque et al., "Dipteran insect flight dynamics. Part 2: Lateral-directional motion about hover," *Journal of Theoretical Biology*, 2010, 265: pp. 306-313.

Gao et al., "A Numerical Analysis of Dynamic Flight Stability of Hawkmoth Hovering," *Journal of Biomechanical Science and Engineering*, 2009, 4(1): pp. 105-116.

Grasmeyer et al., "Development of the black widow micro air vehicle," *39th AIAA Aerospace Sciences Meeting & Exhibit*, Jan. 2001, AIAA Paper 2001-0127: pp. 1-9.

Hilbert, K.B., "A mathematical model of the UH-60 helicopter," National Aeronautics and Space Administration (NASA) Ames Research Center, NASA Technical Memorandum 85890, USAAVSCOM Technical Memorandum 84-A-2, 1984, pp. 1-39.

Hrishikeshavan et al., "Gramian analysis of a shrouded rotor micro air vehicle in hover," *Journal of Guidance Control and Dynamicis*, Sep. 2014, 37(5): pp. 1684-1690.

Hrishikeshavan et al., "Identification of flight dynamics of a cyclocopter micro air vehicle in hover," *Journal of Aircraft*, 2014, 52(1): pp. 116-129.

Humbert et al., "Analysis of insect-inspired wingstroke kinematic perturbations for longitudinal control," *Journal of Guidance, Control and Dynamics*, 2011, 34(2): pp. 618-623.

Keennon et al., "Development of the nano hummingbird: a tailless flapping wing micro air vehicle," in *Proceedings of the 50th AIAA Aerospace Sciences Meeting*, Nashville, Tennessee, 2012, No. 2012-0588.

Ma et al., "Controlled flight of a biologically inspired, insect-scale robot," *Science*, May 2013, 340 (6132): pp. 603-607.

Madangopal et al., "Biologically inspired design of small flapping wing air vehicles using four-bar mechanisms and quasi-steady aerodynamics," *Journal of Mechanical Design*, 2005, 127: pp. 809-816.

Mettler et al., "System identification of small-size unmanned helicopter dynamics," *Proceedings of the 55th Forum of the American Helicopter Society*, 1999, pp. 1-12.

Ostroff et al., "A technique using a nonlinear helicopter model for determining trims and derivatives," National Aeronautics and Space Administration (NASA) Langley Research Center, NASA Technical Notel (TN) D-8159, May 1976, pp. 1-94.

Parsons et al., "Sensor fusion in identified visual neurons," *Current Biology*, 2010, 20(7): pp. 1-5.

Sreetharan et al., "Passive torque regulation in an underactuated flapping wing robotic insect," *Autonomous Robots*, Oct. 2011, 31: pp. 225-234.

Sun et al., "Dynamic flight stability of a hovering bumblebee," *Journal of Experimental Biology*, 2005, 208: pp. 447-459.

Zbikowski et al., "Four-bar linkage mechanism for insectlike flapping wings in hover: concept and an outline of its realization," *Journal of Mechanical Design*, 2005, 127: pp. 817-824.

Zhang et al., "Dynamic flight stability of a hovering model insect: lateral motion," *Acta Mech Sin*, 2010, 26: pp. 175-190.

\* cited by examiner

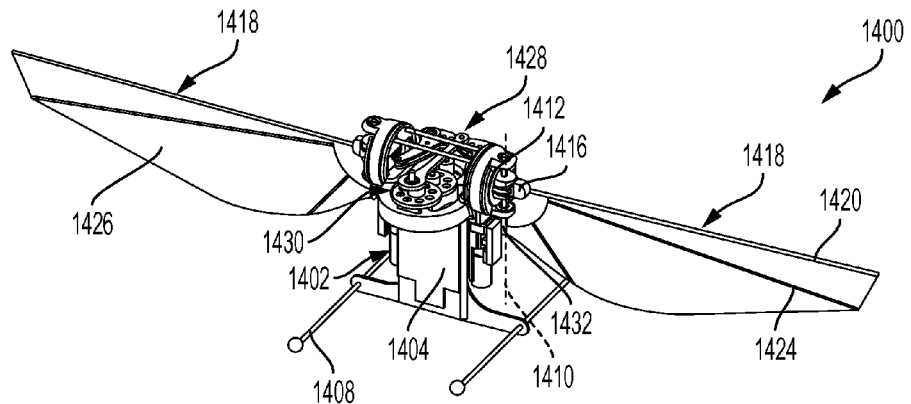
FIG. 14
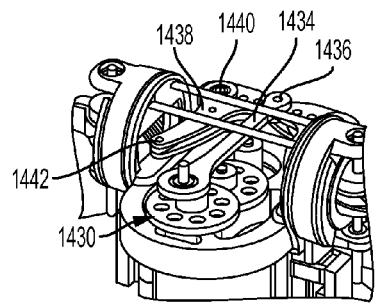
FIG. 15A
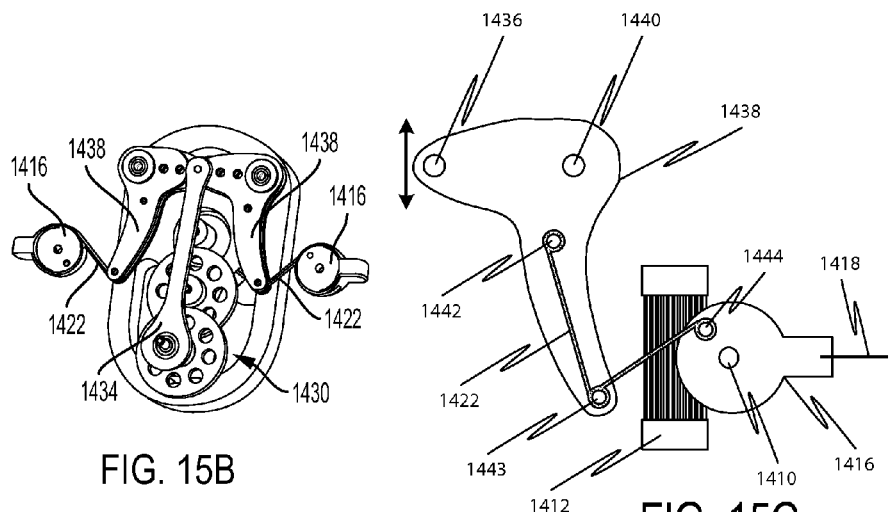
FIG. 15B
FIG. 15C

FLAPPING WING AERIAL VEHICLES

CROSS-REFERENCE TO RELATED APPLICATIONS

The present application claims the benefit of U.S. Provisional Application No. 61/984,892, filed Apr. 28, 2014, which is hereby incorporated by reference herein in its entirety.

STATEMENT REGARDING FEDERALLY SPONSORED RESEARCH

This invention was made with government support under W911NF-08-2-0004 awarded by Army Research Office (ARO). The government has certain rights in the invention.

FIELD

The present disclosure relates generally to aerial vehicles, and, more particularly, to aerial vehicles employing flapping wings, and systems, methods, and devices for said flapping wings.

BACKGROUND

Micro-aerial vehicles at an insect scale would represent a phenomenal improvement in discrete reconnaissance vehicles. The abilities to rapidly explore small spaces and to exploit contextual camouflage are two apparent advantages. But reducing the scale of flapping wing flight has numerous challenges, for example, feedback processing and wing actuation. Moreover, applications for micro-aerial vehicles may have stringent weight limits (e.g., on the order of 1 gram for onboard sensing and computational hardware). Limitations on size, weight, and/or power for the onboard sensing and computation hardware can make traditional state estimation and feedback approaches prohibitively heavy and/or computationally intensive. As such, commercially-available avionics cannot be used. Similarly, the high bandwidth requirements of controlling flapping wings create demands that traditional lightweight servos are unable to achieve.

SUMMARY

Systems, methods, and devices for flapping wing aerial vehicles are presented herein. The flapping wing aerial vehicle can be configured as a self-contained flapping wing tail-less aerial vehicle (e.g., an autonomous flying robot). Onboard feedback electronics can reduce the weight of the stabilizing avionics to less than, for example, 1 g. In addition, the vehicle's stabilization feedback demands can be reduced through the use of wing kinematic controls selected via a theoretical optimization to provide maneuverability. The designed wing motions are made possible by a novel mechanism and actuation design that incorporates both series elastic resonance in the drive transmission and non-contact force application (e.g., magnetic actuation) that directly operates on the wings in parallel with each other.

In one or more embodiments, an autonomous flapping wing aerial vehicle includes a vehicle body, a pair of flapping wings, tunable wing hinges, and elastic drive mechanisms. The tunable wing hinges are coupled to the flapping wings. Each wing hinge can be constructed to deliver a force to a respective one of the flapping wings to alter end points of a stroke thereof. The elastic drive mechanisms can rotate the flapping wings about pivot points to produce the strokes of the flapping wings.

In one or more embodiments, a method operates an autonomous flapping wing aerial vehicle. The aerial vehicle includes a pair of flapping wings coupled to tunable wing hinges and elastic drive mechanisms that rotate the flapping wings about pivot points. The method can include driving the elastic drive mechanisms at frequencies within a range from 10% below their resonance frequency to 1% above their resonance frequency to cause strokes of the flapping wings, and applying forces at the tunable wing hinges to alter end points of the flapping wing strokes and/or changing orientations of the tunable wing hinges to alter inclinations of respective planes of the flapping wing strokes.

In one or more embodiments, a wing-flapping device for an aerial vehicle can include a pair of wing support members, a lift-generating mechanism, and a steering mechanism. Each wing support member can support a root portion of a flapping wing and can be capable of rotation about a flap axis. The lift-generating mechanism can include a drive mechanism and a pair of flexures. The drive mechanism can produce reciprocating motion. Each flexure can be coupled to the drive mechanism and to the respective wing support member such that the reciprocating motion produces a corresponding rotation of the wing support member about the flap axis. The steering mechanism can include one or more actuator magnets, a pair of actuator coils, and a pair of bearings. Each actuator magnet can be coupled to one of the wing support members. Each actuator coil can be configured to provide a magnetic force to the one or more actuator magnets to alter the rotation of the respective wing support member about the flap axis. Each bearing can support a respective one of the actuator coils and the respective wing support member. Each bearing can also have a first rotational axis perpendicular to a second rotational axis of the respective wing support member about the flap axis.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

FIG. 14 shows a second example of a flapping wing aerial vehicle, according to one or more embodiments of the disclosed subject matter.

FIGS. 15A-15C are various close-up and sectional views illustrating operation of a crank drive with a torsion spring in a third example of a series elastic drive mechanism for a flapping wing aerial vehicle, according to one or more embodiments of the disclosed subject matter.

DETAILED DESCRIPTION

Disclosed herein are various novel features of a flapping wing aerial vehicles, in particular self-contained flapping wing tail-less micro-aerial vehicles (e.g., having a weight less than 15 g, excepting a payload of the vehicle). In embodiments of the disclosed subject matter, wing actuation is split into "power" and "steering" mechanisms that operate in parallel. This differs from traditional four-bar linkage mechanisms and provides an attractive split in the lift generation and control aspects. Through the use of this novel near-resonant lift-generating mechanism in parallel with novel control of wing stroke to effect vehicle steering and stabilization, the disclosed aerial vehicles can potentially be made smaller and with less power/control requirements than existing aerial vehicles.

Figure 1:
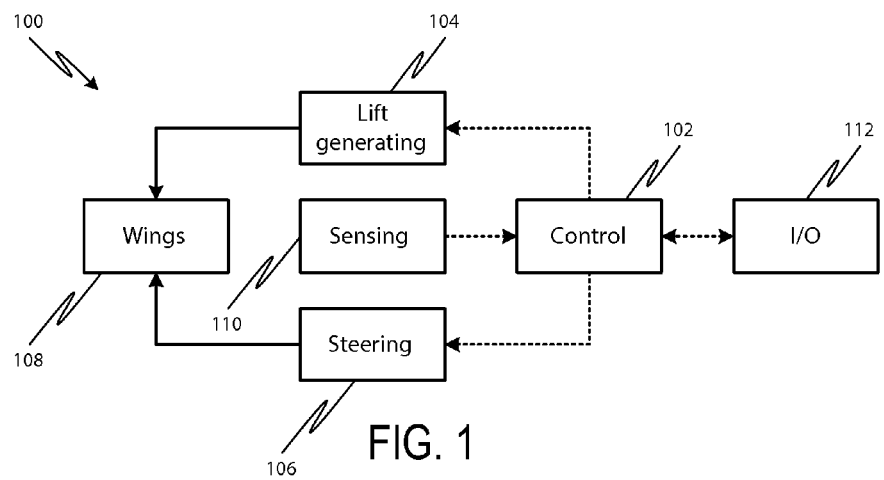
FIG. 1 is a simplified schematic diagram illustrating certain features of a flapping wing aerial vehicle, according to one or more embodiments of the disclosed subject matter.

Referring to FIG. 1, features of an exemplary flapping wing aerial vehicle 100 are illustrated. The aerial vehicle 100 can include a lift-generating mechanism 104 that drives a pair of wings 108 to flap along a stroke plane, e.g., by rotating the flapping wings about respective pivot points to produce strokes of the flapping wings. For example, the wings 108 may move in a direction parallel to the horizontal from a first end of its stroke to a second end of its stroke to generate lift in the vertical direction. Operating in parallel with the lift-generating mechanism 104 is a steering mechanism 106, which generates forces on wings 108 to alter strokes thereof. For example, the steering mechanism 106 can apply a non-contact force or torque to the wings to alter a location of end points of the stroke, e.g., to reduce stroke amplitude, to displace a stroke fore or aft, etc.

The aerial vehicle 100 can include one or more sensors 110 that monitor, for example, motion of the aerial vehicle 100 and/or the wings 108. For example, the aerial vehicle 100 can be provided with wing position sensors, multiple degree-of-freedom (DOF) gyro sensors, and/or multi-DOF accelerometers. The one or more sensors 110 can generate respective signals indicative of measured data, which sensor signals can be used by a controller 102. Alternatively or additionally, the sensor signals can be stored in memory aboard the aerial vehicle 100 for later use or analysis, e.g., for mapping a path traversed by the aerial vehicle, troubleshooting of vehicle dynamics, or for any other purpose.

The controller 102 can control the lift-generating mechanism 104 and/or the steering mechanism 106 fly the flapping wing aerial vehicle 100. For example, the controller 102 can send appropriate control signals to the lift-generating mechanism 104 to flap the wings 108 at an appropriate frequency to take advantage of the resonant effects of the lift-generating mechanism 104 and the wings 108, as described in further detail below. The controller 102 can also send appropriate control signals to the steering mechanism 106 to effect changes in one or more of roll, pitch, yaw, surge, sideslip, and heave by altering stroke motion (e.g., end points or stroke plane inclination) to direct the aerial vehicle over a desired path or to maintain the aerial vehicle at a desired position.

The controller 102 may send the control signals to the steering mechanism 106 and/or to the lift-generating mechanism 104 based on signals from the one or more sensors 110. For example, the controller 102 may vary forces applied to the wings 108 through the steering mechanism 106 as the position of the wing 108 changes, e.g., such that the applied force alternates as the wing 108 passes a center of its stroke. Such control may be based on sensor signals from a wing position sensor or based on synchronization with a drive signal applied to the lift-generating mechanism 104. In another example, the one or more sensors 110 includes a sensor that measures angular rate of the aerial vehicle, and the controller is configured to control the steering mechanism 106 responsively to a signal from the angular rate sensor.

The controller 102 may communicate with external computers or networks via an input/output (I/O) device 112. For example, the I/O device 112 can be a hard-wired connection whereby commands can be uploaded to the controller 102 and/or sensor data can be downloaded from the controller 102. The hard-wired connection can be periodically accessed by a user, for example, when the aerial vehicle 100 has landed between flights. For example, the I/O device 112 may comprise a USB connection, microSD slot, or any other physical connection for conveying data and information. Alternatively or additionally, the I/O device 112 can be a wireless connection whereby commands and/or data can be transmitted with the aerial vehicle in flight or out of flight. For example, the wireless connection can be a cellular or Wi-Fi connection to allow communication over longer ranges, and/or a Bluetooth, ZigBee, Near-field Communication (NFC), or Infrared (IR) system for communication over shorter ranges.

Although not specifically illustrated in the drawings, it will be understood that the aerial vehicle 100 can include other components as well. For example, the aerial vehicle can include a power source, such as rechargeable battery pack, to power the lift-generating mechanism 104, the sensors 110, the steering mechanism 106, the controller 102, and/or the I/O device 112. In addition, the aerial vehicle 100 can include a mechanism for carrying a desired payload. For example, the aerial vehicle 100 may have an electronics board integrated with or separate from controller 102, on which electronics board one or more sensors can be mounted. Such sensors can include, but are not limited to, imaging devices (visible, infrared, etc.), chemical sensors, and radiation detectors. Alternatively or additionally, the aerial vehicle 100 can include a cargo bay to carry a desired payload during flight. Alternatively or additionally, the aerial vehicle 100 can include a mechanism for sampling in-flight and storing on-board for later use, for example, to sample a gas or substance at a remote location and transporting back to a laboratory for analysis.

Figure 2:
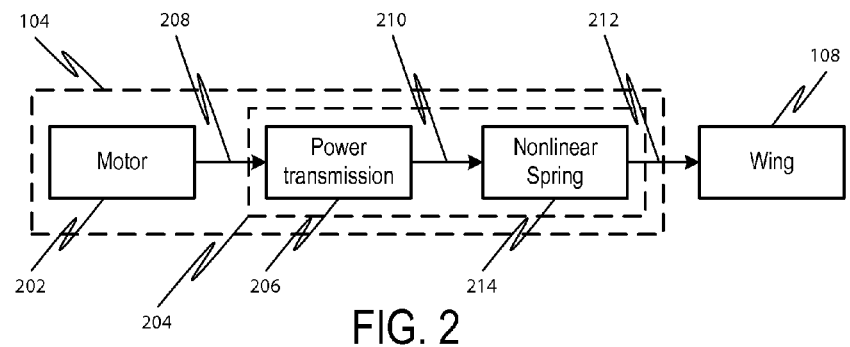
FIG. 2 is a simplified schematic diagram illustrating certain features of a lift-generating mechanism for a flapping wing aerial vehicle, according to one or more embodiments of the disclosed subject matter.

Referring to FIG. 2, features of an exemplary lift-generating mechanism 104 are illustrated. The lift-generating mechanism 104 can include a motor 202 that generates rotary motion 208. For example, the motor 202 can be a brushed magnetic motor, a brushless magnetic motor, or any other motor that produces rotary motion. However, a brushed magnetic motor may enjoy certain advantages over a brushless magnetic motor in micro-aerial vehicle embodiments, including lower cost, fewer issues with reciprocating loads, and reduction in onboard feedback demands for the motor control. An elastic drive mechanism 204 can receive the rotary motion 208 from the motor 202 and convert it into flapping motion 212 of wing 108. The elastic drive mechanism 204 can include a power transmission 206, which converts rotary motion 208 into a reciprocating motion 210. For example, the power transmission 206 can include a gear train coupled to a Cardan drive (see FIGS. 8A-8B) or a crank drive (see FIGS. 15A-15C).

The elastic drive mechanism 204 further includes a spring element 214, which may be formed of, for example, steel or titanium. As explained in further detail below, the spring element 214 may be nonlinear such that the stiffness thereof changes throughout the stroke of the wing, with a stiffness being higher at a center of the stroke than at either end point. Power actuation via the motor 202 and power transmission 206 excites a resonant structure defined by the spring element 214 and attached to the wings 108. Employing resonance allows lift to be generated with far less energy input than a traditional static structure by recovering a portion of the energy used to accelerate/decelerate the flapping mechanism. However, exceeding resonance may result in instability of the aerial vehicle. Accordingly, the controller 102 can be configured to control a speed of the motor 202 to drive each of the elastic drive mechanisms 204 at a frequency within a range from 10% below their resonance frequency (as defined by the stiffness of the spring element 214 when the wing 108 is at an end of its stroke) to 1% above their resonance frequency.

Figure 3:
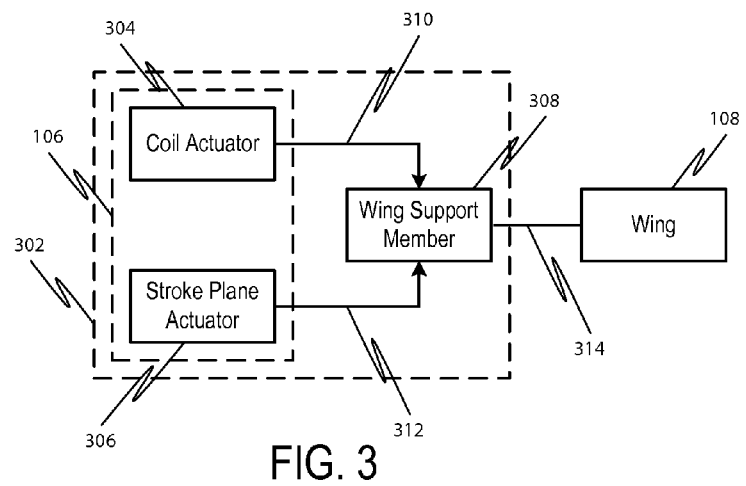
FIG. 3 is a simplified schematic diagram illustrating certain features of a steering mechanism for a flapping wing aerial vehicle, according to one or more embodiments of the disclosed subject matter.

Referring to FIG. 3, features of an exemplary steering mechanism 106 are illustrated. The steering mechanism 106 can be considered as part of a tunable hinge 302 that allows the wing 108 to rotate about its flap axis. In particular, the wing can be rotatably held at its root 314 by a wing support member 308. Forces can be applied to the wing support member 308 to alter the stroke of the flapping wings 108 to thereby steer and/or stabilize flight of the aerial vehicle 100. For example, the steering mechanism 106 can include a magnetic coil actuator 304 that applies a non-contact torque or force 310 to the wing support member 308 (directly, as in FIGS. 16A-16B, or indirectly, as in FIG. 12A) to alter rotation of the wing about its flap axis.

Figure 5A:
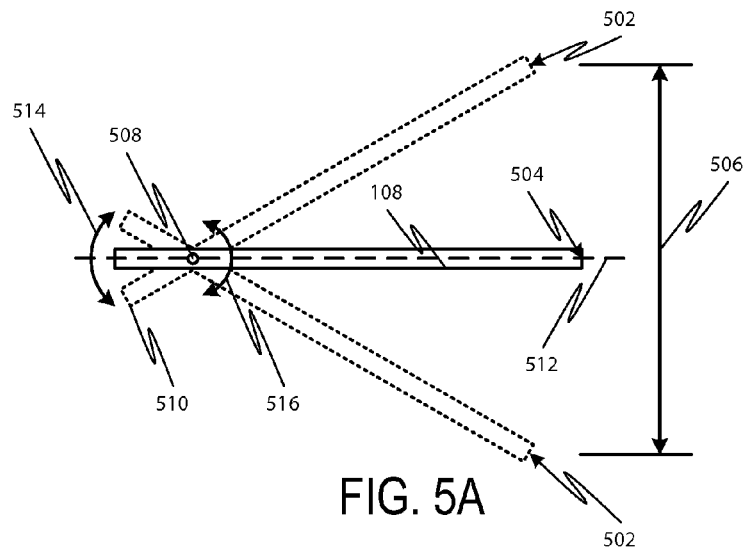
FIG. 5A is a top view of a stroke of a wing of a flapping wing aerial vehicle, according to one or more embodiments of the disclosed subject matter.

Thus, a wing 108 can rotate about a flap axis 508 in response to a drive force 514 applied at a drive portion 510 (e.g., wing support member 308) by the lift-generating mechanism 104, as illustrated in FIG. 5A. The wing 108 may move from end point 502 through center 504 to the opposite end point 502 as it flaps to define an end-to-end stroke amplitude 506. The magnetic coil actuator 304 can apply a torque 516 to the wing 108 during portions or the entirety of a stroke period, to alter the stroke amplitude 506 and/or location of end points 502.

Figure 5B:
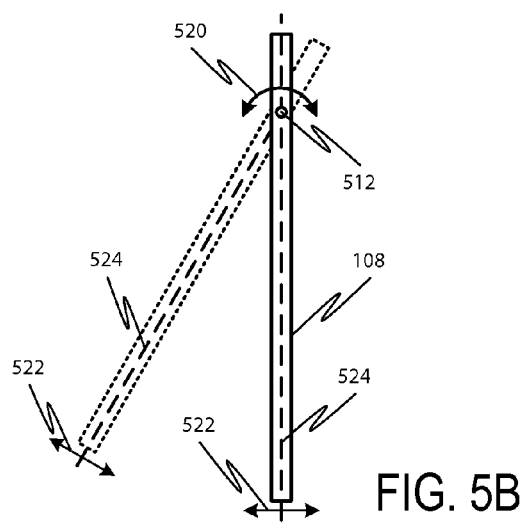
FIG. 5B is a side view illustrating inclination of a stroke plane of a wing of a flapping wing aerial vehicle, according to one or more embodiments of the disclosed subject matter.

Returning to FIG. 3, the steering mechanism 106 can optionally include a stroke plane actuator, which can operate via rotation 312 to alter an orientation of the flap axis (and thus the stroke plane of the wing) with respect to vertical by changing the orientation of the wing support member 308 and wing 108. Thus, the centerline 524 of wing 108 and its corresponding stroke plane 522 can be rotated about tilt axis 512 such that the centerline makes an angle with vertical, as illustrated in FIG. 5B.

Yaw control can be achieved by providing differences in the stroke plane inclination between the pair of wings 108. Since yaw dynamics operate on a lower bandwidth, servo control can be used on this axis. The stroke plane inclination degree of freedom is enabled by stroke plane servo (i.e., stroke plane actuator 306) and a lightweight ball-bearing in the tunable hinge 302. A magnet on the rotating component of the tunable hinge 302 and a Hall effect sensor mounted to the stationary component of the tunable hinge 302 or the aerial vehicle body can be used to measure the stroke inclination for servo feedback.

Figure 4:
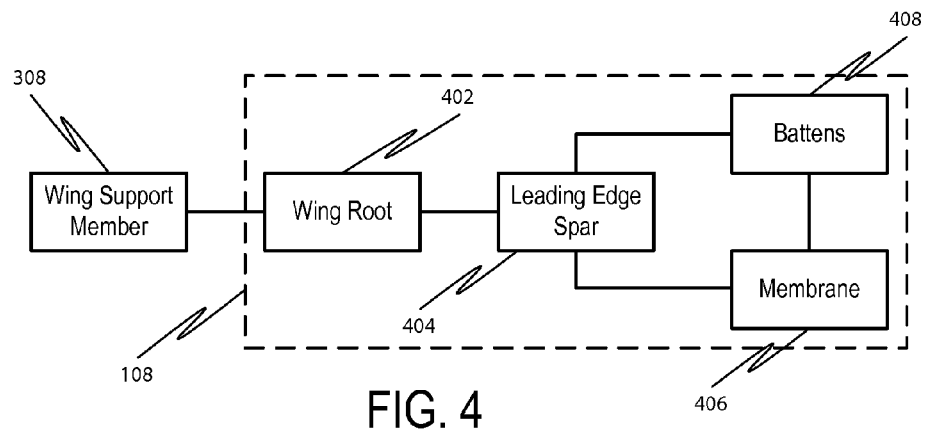
FIG. 4 is a simplified schematic diagram illustrating certain features of a wing for a flapping wing aerial vehicle, according to one or more embodiments of the disclosed subject matter.

Referring to FIG. 4, features of an exemplary wing 108 are illustrated. The wing 108 can include a wing root portion 402, which may be disposed nearest the aerial vehicle body and is coupled to the wing support member 308, through which flapping motion may be applied to the wing. In addition, the root portion 402 may include a root spring element, which also defines a resonant frequency associated with the flapping of the wing 108. The controller can be configured to control a speed of the motor to drive the flapping wings 108 at a frequency within 5% of their resonance frequency. Stiffness of the root spring element can be in the stroke plane about a vertical axis and can allow stroke amplitude to increase when drive at or near resonance.

Extending from the root portion 402 along a top of the wing is a leading edge spar 404. Depending vertically and/or horizontally from the leading edge spar 404 may be one or more battens 408. A membrane 406 can extend between the leading edge spar 404 and the battens 408 and can generate lift during flapping of the wing 108. In order to avoid the need for an onboard wing pitch actuator and feedback mechanism to regulate wing pitch angle, the wing pitch angle is the result of mechanically tuned wings that incorporate a bi-stable equilibrium with two wing incidences to passively achieve pronation and supination. The mechanically tuned wings are used to create lift-maximizing incidence angles on the fore and aft stroke. The use of passive wing rotation eliminates the need for a wing pitch actuator and removes the need for a wing pitch feedback loop.

In particular, deformation of the wing membrane is based on the angular velocity, wing structural stiffness (primarily vertical stiffness), and frame geometry. The angular velocity affects the inertial and aerodynamic forces applied to the wing throughout the stroke, while frame geometry impacts static membrane stiffness, i.e., how loose or taught the wing membrane is when not moving. The structural stiffness affects how the frame deforms under aerodynamic and inertial loads, and thus how membrane stiffness changes throughout the stroke due to these loads. The frame geometry and/or structural stiffness features may be a function of, for example, a root portion and/or a dihedral angle of the wing. The root portion can be provided with vertical flexibility, i.e., a root spring element having a vertical stiffness about a horizontal axis perpendicular to the wing. This flexibility, coupled with the dihedral angle in the wing, can determine how the wing membrane deforms throughout the stroke, which deformation effectively changes the wing pitch relative to the stroke plane. Thus, pitch angle motion of the wing 108 during flapping can be passively controlled and defined by the stiffness of the wing structure and the amount of excess wing membrane.

The wing pitch angle motion repeats throughout the wing stroke and is used in the lift generation, not in flight control. The wing pitch thus changes passively relative to the stroke plane throughout the stroke due to inertial and aerodynamic forces. In contrast, the angle of the wing stroke plane is active, meaning that the flight controller has the ability to modulate it in flight, for example, via stroke plane actuator 306.

Figure 6:
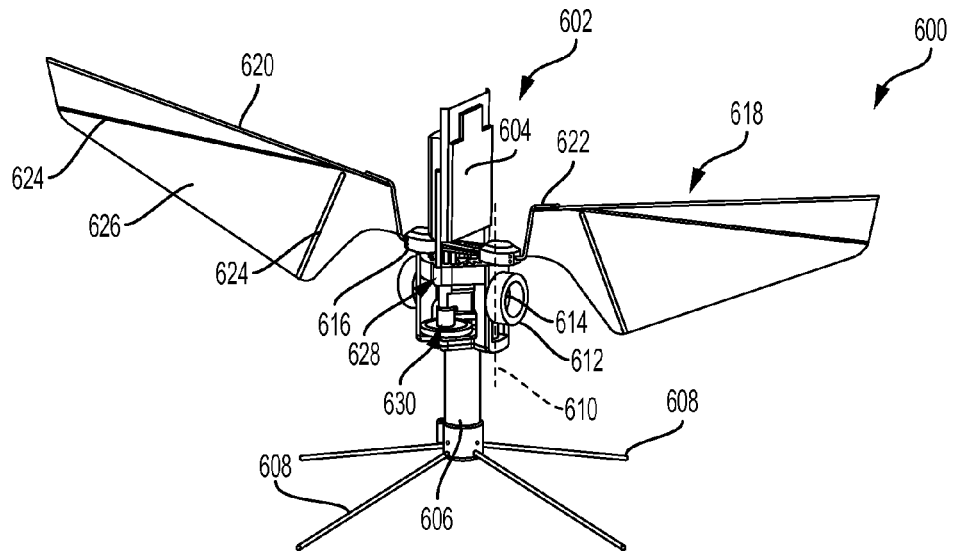
FIG. 6 shows a first example of a flapping wing aerial vehicle, according to one or more embodiments of the disclosed subject matter.

Referring to FIG. 6, a first embodiment of an aerial vehicle 600 is illustrated. The aerial vehicle 600 can include a vehicle body 602, which may support a controller 604 and a motor 608, in addition to other components. At a lower end of the vehicle body 602 may be disposed one or more legs 608 that operate to support the aerial vehicle 600 in a substantially vertical orientation prior to take-off and upon landing. Arrangements for the controller, motor, and other components other than that specifically illustrated in FIG. 6 are also possible according to one or more contemplated embodiments. For example, the controller and motor may be arranged at a same location on the vehicle body 602, or with positions reversed from those shown in FIG. 6.

In a central region of the vehicle body 602 may be disposed components for the steering and lift-generating mechanisms. For example, above the motor 608 may be a gear train 630 that couples the motor to a Cardan drive 628. The Cardan drive 628 can convert the rotary motion from the motor 608 into reciprocating motion. Coupled to the Cardan drive 628 on opposite sides of the vehicle body 602 are wings 618. Wing support members 616 can hold each wing 618 and convey the rotational input about flap axis 610 from the Cardan drive 628.

Figure 7A:
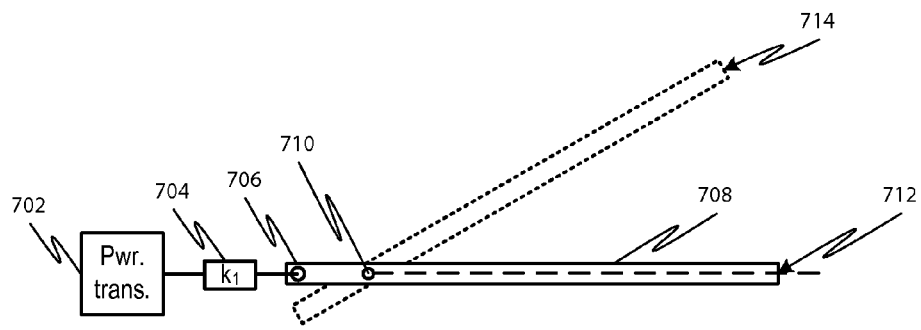
FIGS. 7A-7B illustrate aspects of a series elastic drive mechanism with a wing at a center and end of a stroke, respectively, for a flapping wing aerial vehicle, according to one or more embodiments of the disclosed subject matter.
Figure 7B:
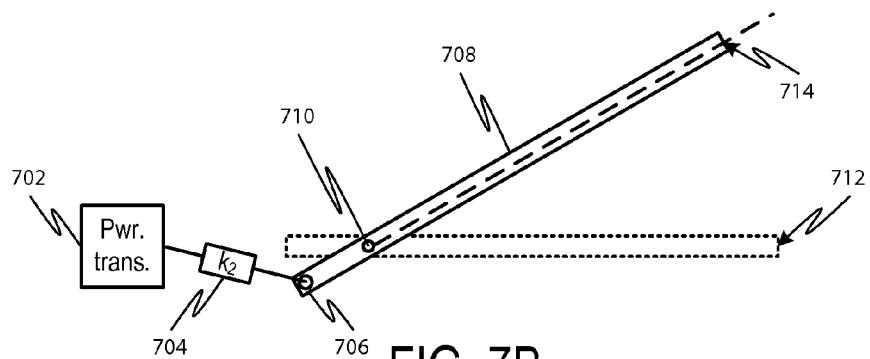

As noted above, the elastic drive mechanisms can be designed such that the connection between the drive 702 and the wing 708 varies across the wing stroke, e.g., by use of a variable or nonlinear spring element 704, as illustrated in FIGS. 7A-7B. Thus, since it is desirable for a wing 708 to be at its stroke center 712 when the drive pin 706 is at its center, the spring element 704 is relatively stiff (i.e., has a spring constant of $k_1$) to provide a rigid connection and avoid relative motion. In contrast, relative motion is desirable when the wing 708 rotates about its flap axis 710 to the end points 714 of the wing stroke in order to generate control forces that move the wing 708. The spring element 704 thus becomes relatively soft (i.e., has a spring constant of $k_2 \ll k_1$) as the wing 708 approaches the stroke end points 714. The spring element 704 may change stiffness throughout the stroke, with a stiffness maximum occurring at the center 712 of the wing stroke and a stiffness minimum occurring at both ends 714 of the wing stroke. Thus, the spring element may be a variable or nonlinear spring element.

Figure 8A:
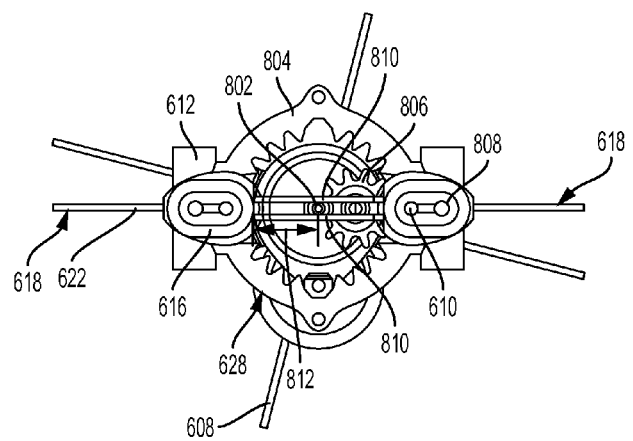
FIGS. 8A-8B are sectional views illustrating operation of a Cardan drive in a first example of a series elastic drive mechanism for a flapping wing aerial vehicle, according to one or more embodiments of the disclosed subject matter.
Figure 8B:
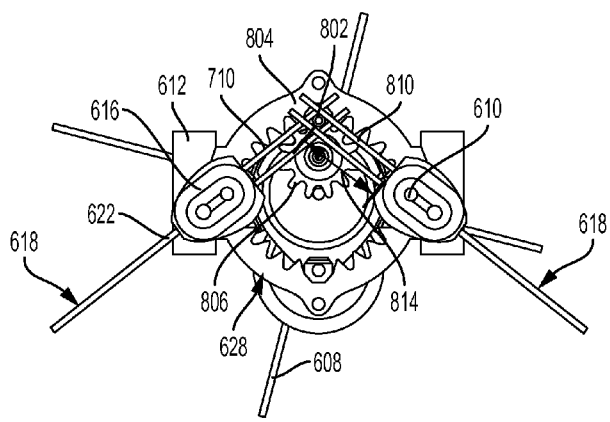

In the Cardan drive 628, as shown in FIGS. 8A-8B, the nonlinear spring is provided by one or more variable length cantilever flexures 810, which defines the stiffness between the power transmission drive output (e.g., the Cardan drive output pin 802) and the wing 618 via wing support member 616. A rigid connection (i.e., effectively infinite stiffness) means that the wing motion would be prescribed by the motion of the pin 802 and no relative motion would be possible. In contrast, a flexible connection (i.e., low stiffness) means that relative motion is possible. With the flexible connection, the force required to generate relative motion is a function of the stiffness of that connection.

The Cardan drive 628 can include a ring gear 804 surrounding a planet gear 806, which travels around an inner circumference of the ring gear 804. With the planet gear 806 at a central location corresponding to a center of the wing stroke, the output pin 802 is centered within the ring gear 804, thereby defining a minimum flexure length 812 from the output pin 802 to the wing support member 616. This minimum flexure length 812 corresponds to the high stiffness yielding the desired rigid connection at centerstroke. As the planet gear 806 moves away from the central location to fore or aft positions (at the top or bottom of the ring gear 804, as shown in FIG. 8B), the output pin 802 is displaced away from the center of the ring gear 804 and the wing support members 616, thereby defining a maximum flexure length 814 from the output pin 802 to the wing support member 616. This maximum flexure length 814 corresponds to the low stiffness yielding the desired flexible connection at stroke endpoints.

Other configurations for varying the spring constant as a function of stroke are also possible according to one or more contemplated embodiments. For example, the length between the drive configuration can be varied such that a distance between the output pin and the wing support member reduces to zero at the center of the stroke. In another example, the spring elements can have a non-uniform thickness such that a change in the distance between the output pin and the wing support members further impacts the spring constant.

Figure 9A:
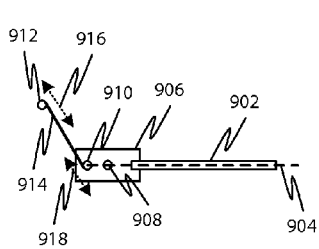
FIGS. 9A-9C are simplified schematic diagrams illustrating operation of a second example of a series elastic drive mechanism incorporating a torsion spring for a flapping wing aerial vehicle, according to one or more embodiments of the disclosed subject matter.
Figure 9B:
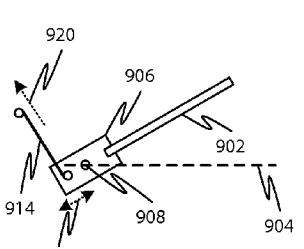
Figure 9C:
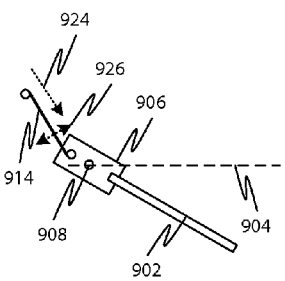

In an alternative configuration, the spring constant between the drive output pin 912 and the wing support member 906 can be varied using a torsion spring 914, as illustrated in FIGS. 9A-9C. The torsion spring 914 extends between the drive output pin 912 (e.g., Cardan output pin 802) and a pin joint 910 of the wing support member 906. As with other illustrated embodiments, the wing support member 906 supports the wing 902 so that it can flap about flap axis 908. The torsion spring is driven back and forth along its length by the drive mechanism, e.g., drive directions 916, 920, and 924. At end points as shown in FIGS. 9B-9C, the rotation 922 or 926 of the wing 902 is nominally perpendicular to the spring 914, so that the spring can readily bend (i.e., soft connection). However, at a center 904 of the wing stroke, the rotation 918 of the wing 902 is parallel to the spring 914, thereby providing a stiffer connection.

Returning to FIG. 6, spaced from the wing support members 616 is an actuator coil 612 that applies forces to permanent magnets 614 coupled to the wing support members 616 via shaft 632 (see FIG. 12A) in order to alter stroke amplitude and/or end points of each wing 618. Although illustrated as below the wing support members 616, other arrangements are also possible. For example, the actuator coil 612 and permanent magnets 614 can be disposed above the wing support members 616 or at a same height as the wing support members (see FIGS. 16A-16B).

Figure 10A:
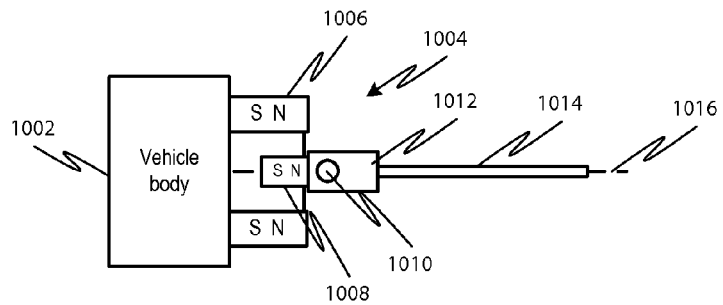
FIG. 10A shows general features of a tunable hinge for steering control of a wing at a center of its stroke for a flapping wing aerial vehicle, according to one or more embodiments of the disclosed subject matter.
Figure 10B:
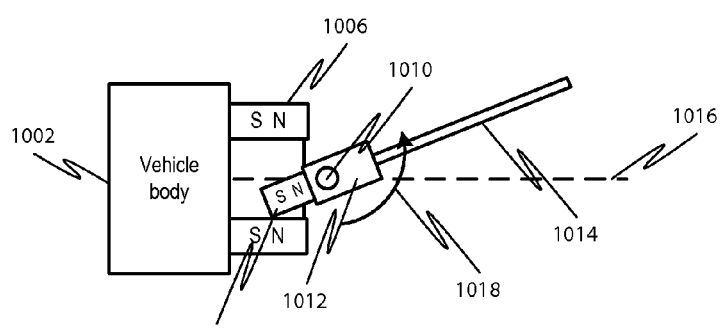
FIGS. 10B-10C show torques applied by the tunable hinge of FIG. 10A with the wing at an end of its stroke for a flapping wing aerial vehicle, according to one or more embodiments of the disclosed subject matter.
Figure 10C:
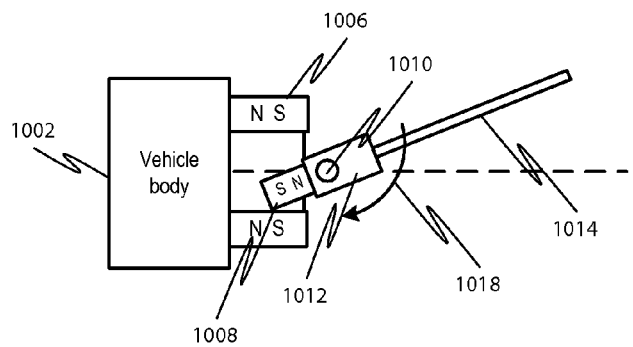

As noted above, the tunable hinge 1004 can be designed to provide non-contact forces or torques to the wing at end points of the stroke to effect steering and/or stabilization. For example, the wing support member 1012 (or a shaft coupled to the wing support member, e.g., shaft 632) can have powerful actuator magnets 1008 (e.g., rare-earth magnets) coupled thereto, as illustrated in FIGS. 10A-10C. The actuator magnets can be located within a periphery of an electromagnetic coil actuator 1006 supported on the vehicle body 1002. The controller can include several electromagnetic coil driver control circuits to apply current through the actuator coil 1006. As the wing 1014 rotates about its flap axis 1010 from a center 1016 of the stroke to an end point, misalignment between the magnetic field of the permanent magnets 1008 and the actuator coil 1006 result in a non-contact applied torque on the wing support member 1012 and thus the wing 1014. Thus, small modifications can be made to the wing stroke pattern without the need for physical contact. The direction of the torque applied depends on the orientations of the magnetic field polarities.

Stroke amplitude control of a wing 1014 can be enabled by applying a synchronized square wave to the coil actuators 1006, which applies noncontact forces additive (or subtractive) forces 1018 to each wing 1014. The square wave synchronization can be achieved, for example, via a magnet on the transmission and a Hall effect sensor on the vehicle body. Independent control of left and right wingstroke amplitude can provide for bank angle (roll) control. Due to the need to synchronize the square wave with the wingstroke, roll stabilization may drive the computational requirements of this control paradigm.

Figure 12A:
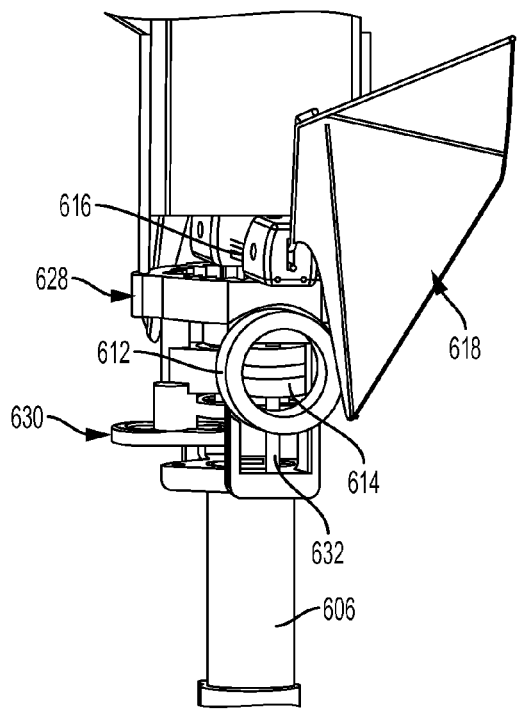
FIG. 12A is a side view of the first example of the flapping wing aerial vehicle, according to one or more embodiments of the disclosed subject matter.
Figure 12B:
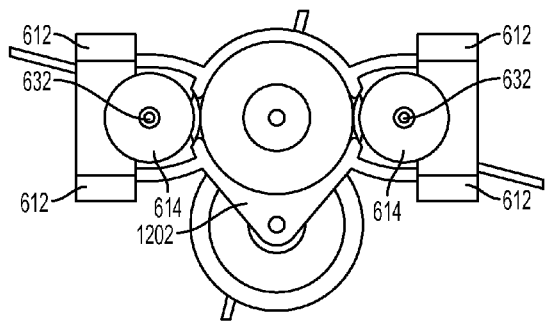
FIG. 12B is a close-up sectional view of a first example of a tunable hinge for steering control of a flapping wing aerial vehicle, according to one or more embodiments of the disclosed subject matter.

Referring now to FIGS. 12A-12B, the tunable hinge features of the embodiment of FIG. 6 are illustrated in further detail. The actuator magnet 614 is attached to the same shaft 632 that the wing support member 616 is attached to. The actuator magnet 614 can be a stack of magnets, as illustrated in FIG. 12A, or a single monolithic magnet. As shown in the figures, the magnet 614 is shifted inwardly relative to the coil 612 in order to accommodate the shaft 632 passing external to the coil 612. The actuator coil 612 can be supported on the vehicle body by a mount 1202, which may be constructed to allow drive power to pass therethrough and/or free motion of the actuator magnets. In an alternative configuration, the actuator coil 612 can be provided with a vertical hole to allow the shaft 632 to pass therethrough and to have the actuator magnets 614 centered axially with respect to the coil 612. In still another alternative, the actuator magnets 614 can be shifted outwardly relative to the coil 612 with the wing shaft 632 being shifted in a similar direction and concomitant changes to the wing support and drive components.

Figure 13A:
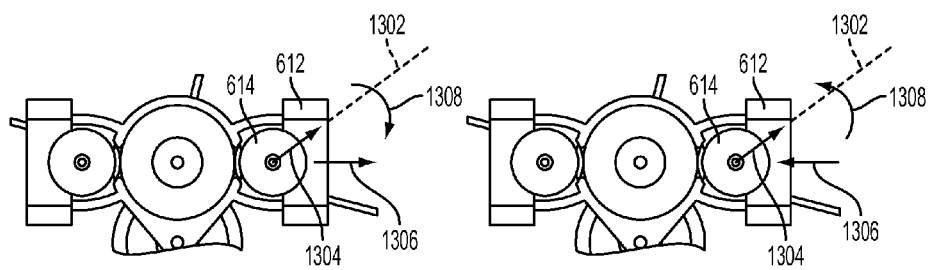
FIGS. 13A-13B illustrate magnetic field orientations and effective torques applied to a wing at a first end of its stroke by the tunable hinge of FIG. 12B.
Figure 13B:
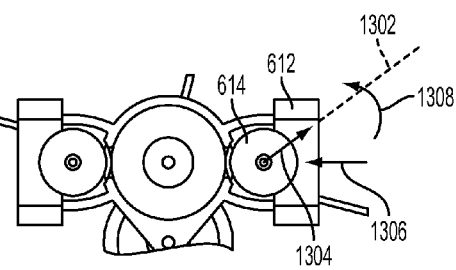
Figure 13C:
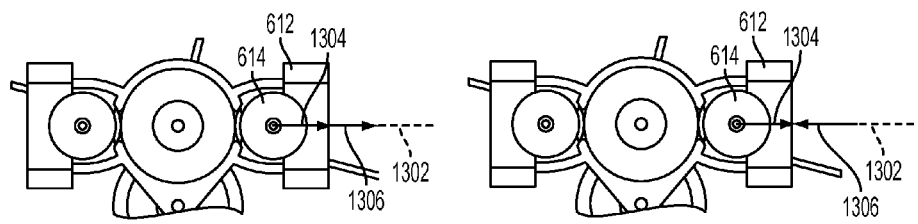
FIGS. 13C-13D illustrate magnetic field orientations and effective torques applied to the wing at a center of its stroke by the tunable hinge of FIG. 12B.
Figure 13D:
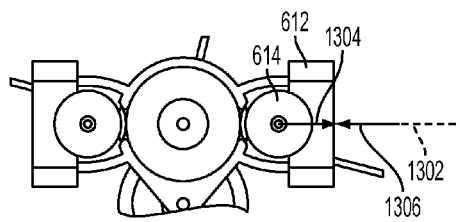
Figure 13E:
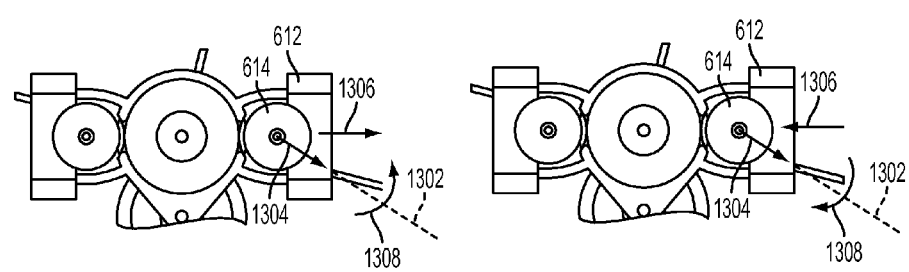
FIGS. 13E-13F illustrate magnetic field orientations and effective torques applied to the wing at a second end of its stroke by the tunable hinge of FIG. 12B.
Figure 13F:
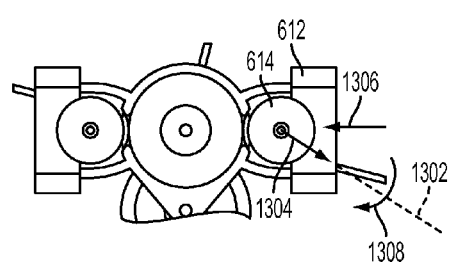

Referring to FIGS. 13A-13E, the direction of the magnetic field 1304 of the actuator magnets 614 follows the motion of the wing 1302. Since the magnets 614 are permanent, their polarity does not change once fixed. In contrast, the polarity of the magnetic field 1306 of the actuator coil 612 depends on the direction of current applied thereto. However, the direction off the actuator coil magnetic field would remain constant. When the flapping wing 1302 is at a center 1302 of its stroke, as shown in FIGS. 13C-13D, the magnetic field 1304 of the actuator magnet 614 and the magnetic field 1306 of the actuator coil 612 are parallel such that no force is applied regardless of the polarity of the actuator coil magnetic field 1306. At ends of the stroke, the misalignment between the magnetic field 1304 and the magnetic field 1306 results in a torque 1308 being applied to the wing, the torque 1308 tending to align the magnetic fields 1304, 1306 so that they are parallel and have the same orientation of polarity. Thus, in FIGS. 13A and 13E, the tunable hinge provides a retarding force that can move the end points toward the center. In contrast, in FIGS. 13B and 13F, the tunable hinge provides an enhancing force that can move the end points away from the center.

Direct current (DC) actuation of coil 612 maintains a constant direction of current throughout the stroke (i.e., no change in polarity of coil magnetic field 1306), so it has same effect at either end of stroke (i.e., to retard or enhance end point). Alternating current (AC) actuation of coil 612 can be synchronized with the wing 1302 motion such that the current direction (and the resulting magnetic field 1306 polarity) reverses at a center of the stroke. Thus, for one half of the stroke, the polarity is a first value (e.g., FIG. 13A) and for the second half of the stroke the polarity is the opposite value (e.g., FIG. 13F). This results in a fore or aft bias of the entire wing stroke. In other words, a location of one of the end points is increased in distance from the centerline while the location of the opposite end point is decreased in distance from the centerline. By appropriate combination of DC, AC, and current amplitude modulation in each wing independent of the other wing allows for generation of roll, pitch, and yaw control forces.

Figure 11A:
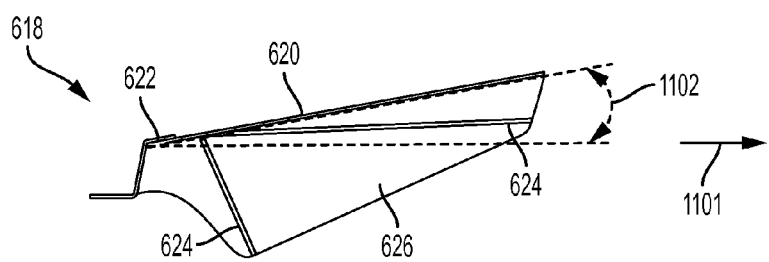
FIG. 11A shows a wing, as seen from a direction parallel to its stroke plane, for a flapping wing aerial vehicle, according to one or more embodiments of the disclosed subject matter.

Returning to FIG. 6, each wing 618 has a wing root spring 622 that attaches the wing 618 to its respective wing support member 616. Extending from a top end of the wing root spring 622 away from the vehicle body 602 is a leading edge wing spar 620. The wing spar 620 may extending horizontally away from the vehicle body 602 and slightly upward vertically to form a dihedral angle 1102, as shown in FIG. 11A, when the wing is a center stroke. Extending from the wing spar 620, for example, from a location proximal to the root spring 622, is one or more battens 624. For example, one of the battens may extend in a mostly horizontal direction with a lesser vertical component while the other of the battens may extend in a mostly vertical direction with a lesser horizontal component. A wing membrane 626 can extend between and connect the battens 624, the wing spar 620, and the root spring 622. Alternatively or additionally, the wing membrane 626 can further extend and connect to a shaft running through the flap axis, for example, as illustrated in FIG. 14.

As noted above, the wing 618 can also include an elastic component, in particular, proximal to the wing root of the wing. As illustrated in FIG. 11A, the wing root attachment portion 622 can be bent in a vertical direction, thereby acting as a spring. To this end, the wing root attachment portion 622 may be formed of a flexible material, for example, titanium or spring steel. This wing root spring 622 can improve characteristics of the wing stroke passively. By flapping near resonance, stroke amplitude is increased thereby increasing lift generating, where the wing root spring 622 acts as torsional spring about the vertical axis. In addition, the wing root spring 622 allows the location of the wing tip in the vertical axis to be modified throughout the stroke, which in turn impacts the angle of attack of the wing.

The root spring 622 can provide flexibility in two axes: flap and vertical. In the flap axis, the root spring 622 enables flap at or just below resonance to increase flap amplitude. In the vertical axis, the root spring 622 acts against the force due to rotational inertia 1101. As a result, at the center stroke, the wing tip is lower than at the end strokes. This is beneficial in a number of ways. First, wing angle of attack is a function of membrane stiffness, which is reduced when the spar is flattened. In particular, when the leading edge spar 620 of the wing 618 is pressed down, the wing membrane 626 loosens. Under aerodynamic load, the loosened wing membrane 626 leads to a shallower angle of attack. When the force on the leading edge spar 620 of the wing 618 is released, the membrane 626 tightens thereby keeping the wing 618 more vertical (i.e., having a steeper angle of attack). The inertial and aerodynamic loads both impact how the wing 618 behaves. By virtue of the wing root spring stiffness 622 and the dihedral angle 1102 (e.g., 10°), a desired wing behavior throughout the wing stroke can be passively achieved. For example, the wing motion may follow a "figure-8" flapping pattern. Force 1101 due to rotational inertia is a maximum at center stroke (maximum rotational rate) and zero at stroke end points (change in flap direction results in zero rotational rate). This force generates a moment that reduces the dihedral angle 1102 by pulling the leading edge spar 620 flat. This provides better (shallower) angle of attack for higher velocity points in stroke (center stroke) and steeper angle of attack at lower velocity points in stroke (end points). Second, this maintains stable wing behavior in the vertical axis. Third, it may enable capture of leading edge vortices at a point of direction change.

Figure 11B:
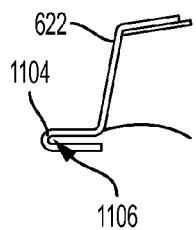
FIGS. 11B-11C are close-up and overall views, respectively, of a first variation of a wing root attachment portion for coupling a wing to a wing support member for a flapping wing aerial vehicle, according to one or more embodiments of the disclosed subject matter.
Figure 11C:
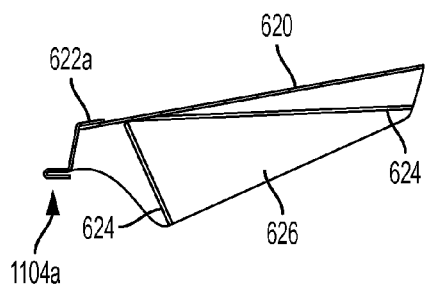
Figure 11D:
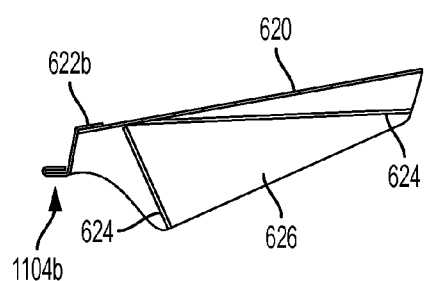
FIG. 11D is an overall view of a second variation of a wing root attachment portion for coupling a wing to a wing support member for a flapping wing aerial vehicle, according to one or more embodiments of the disclosed subject matter.

Alternatively or additional, the root spring 622 can include a curved or folded portion 1104 where it couples to the wing support member. For example, as shown in FIG. 11B, the root spring 622 can have a curvature 1104 that fits into a slot in the wing support member 616 and holds the wing 618 substantially vertical. A set screw 808 can extend through hole 1106 in the curved portion 1104 of the root spring 622 such that the wing support member 616 holds the wing at the curve 1104. The curvature, either curved up 1104b as shown in FIG. 11D or curved down 1104a as shown in FIGS. 11B-11C, can affect wing deformation in the vertical plane during operation. In particular, the upward curve (FIG. 11D) can give additional upward flexibility, while the downward curve (FIG. 11C) can give additional downward flexibility.

Referring to FIG. 14, a second embodiment of an aerial vehicle 1400 is illustrated. The aerial vehicle 1400 can include a vehicle body 1402, which may support a controller 1404 and a motor 1406, in addition to other components. At a lower end of the vehicle body 1402 may be disposed one or more legs 1408 that operate to support the aerial vehicle 1400 in a substantially vertical orientation prior to take-off and upon landing. Arrangements for the controller, motor, and other components other than that specifically illustrated in FIG. 14 are also possible according to one or more contemplated embodiments.

At a top region of the vehicle body 1402 may be disposed components for the steering and lift-generating mechanisms. For example, above the motor 1406 may be a gear train 1430 that couples the motor to a crank drive 1428. The crank drive 1428 can convert the rotary motion from the motor 1408 into reciprocating motion. Coupled to the crank drive 1428 on opposite sides of the vehicle body 1402 are wings 1418. Wing support members 1416 can hold each wing 1418 and convey the rotational input about flap axis 1410 from the crank drive 1428.

Referring to FIGS. 15A-15B, features of the lift-generating mechanism for the aerial vehicle of FIG. 14 are illustrated in further detail. In particular, a gear train 1430 connects a crank arm 1434 of the crank drive 1428 to a rotary motor. The rotary motion is thus converted to a linear reciprocating motion of the crank arm 1434 in a fore-aft direction. The crank arm 1434 connects to a crank arm pin 1436 on drive arms 1438, which convert the reciprocating motion of the crank arm 1434 into pivoting actuation of the wing support member 1416 about the flap axis 1410. The drive arms 1438 for each wing can actually be a pair of drive arms, with top and bottom drive arms 1438 containing a nonlinear spring 1422 therebetween and able to pivot about axis 1440. The nonlinear spring 1422 couples the motion from the drive arms 1438 to the wings support members 1416 and thus the wings 1418.

In the crank drive configuration, as shown in FIG. 15C, the nonlinear spring is provided by one or more torsion springs 1422, which defines the stiffness between the power transmission drive output (e.g., the crank arm pin 1436) and the wing 1418 via wing support member 1416. The torsion spring 1422 can be formed from, for example, steel music wire or titanium. The two pin joints 1436, 1442 act as a rigid attachment, while the center coil 1443 acts as a torsional spring, always under tension, with its stiffness determining the resonant frequency of the drive. The single pin joint 144 between the flexure 1422 and the wing support member 1416 provides rotational degree for freedom. Note that the flap axis 1410 can be offset from a center of the actuator coil 1412 to provide 180° of stroke angle.

Returning to FIG. 14, each wing 1418 has a wing root that attaches the wing 1418 to its respective wing support member 1416. Extending from the wing root away from the vehicle body 1402 is a leading edge wing spar 1420. The wing spar 1420 may extend horizontally away from the vehicle body 1402. Extending from the wing spar 1420, for example, from a location proximal to the wing support member 1416, is one or more battens 1424. A wing membrane 1426 can extend between and connect the battens 1424, the wing spar 1420, and the wing root.

Figure 16A:
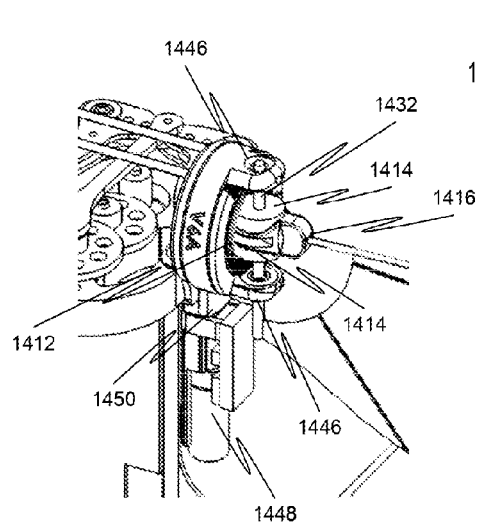
FIGS. 16A-16B are close-up and sectional views of a second example of a tunable hinge for steering control of a flapping wing aerial vehicle, according to one or more embodiments of the disclosed subject matter.
Figure 16B:
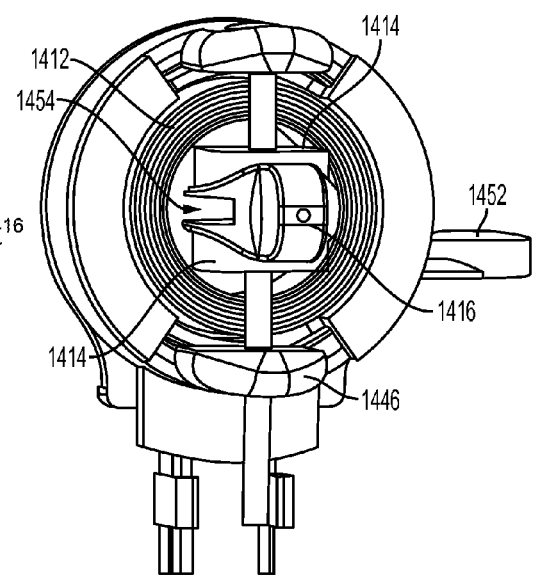

Referring to FIGS. 16A-16B, features of the steering mechanism for the aerial vehicle of FIG. 14 are illustrated in further detail. Flap bearings 1446 can be mounted above and below coil 1412 to support a shaft of the wing 1418. A portion of the wing membrane 1426 can also be attached to the shaft. A drive arm pin mount 1452 can be incorporated to ensure proper geometric relationship. Surrounding a portion of the wing support members 1416 is an actuator coil 1412 that applies forces to permanent magnets 1414 coupled to the wing support members 1416 in order to alter stroke amplitude and/or end points of each wing 618. The magnets 1414 can be disposed on the top and bottom of an attachment portion 1454 for attaching the spring element 1422 to the support member 1416. As with previously described embodiments (see FIGS. 13A-13F and attending discussion), appropriate control of magnetic forces applied by the actuator coil 1412 to the permanent magnets 1414 can alter the wing strokes in a non-contact manner to effect steering and/or stability control.

Figure 17:
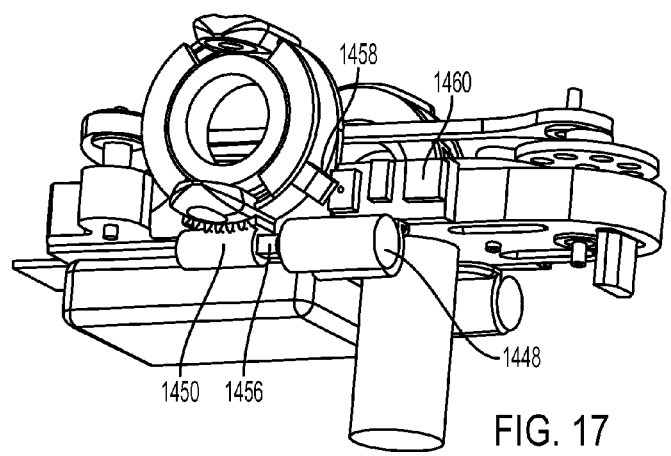
FIG. 17 shows stroke-plane control features of a first variation of the second example of a tunable hinge of a flapping wing aerial vehicle, according to one or more embodiments of the disclosed subject matter.
Figure 18:
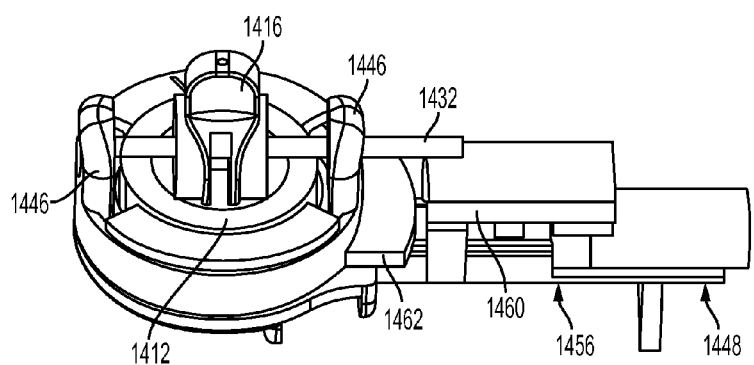
FIG. 18 shows stroke-plane control features of a second variation of the second example of a tunable hinge of a flapping wing aerial vehicle, according to one or more embodiments of the disclosed subject matter.

Referring to FIG. 17, features of a stroke plane actuator of a steering mechanism are illustrated in further detail. In particular, a servo motor 1448 can be provided for actuating a worm gear 1450 via a gearbox 1456. For example, the motor 1448 can be a 4-mm diameter brushed magnetic motor and the gearbox can be a planetary (2-stage) gear. Alternatively, piezoelectric actuators can be used in place of one or more of the illustrated components. The worm gear 1450 allows for rotation of the actuator coil and the wing support member about an axis (e.g., tilt axis) perpendicular to the direction of the flapping. In an alternative configuration, the worm gear 1450 can be replaced with, for example, a face gear, as illustrated in FIG. 18. In addition, the motor 1448, planetary gearbox 1456, and servo electronics 1460 can be moved to a position vertically below the tunable hinge.

The rotation, for example, can be ±10°. Such rotation causes the stroke plane and the center of the wing stroke to tilt with respect to vertical, thereby allowing inclination of the stroke plane of the flapping wings. A magnet or Hall sensor 1458 can be provided for feedback regarding inclination of the stroke plane. Servo electronics 1460 can control the servo motor 1448, for example, responsively to signals from the Hall sensor 1458 to achieve a desired inclination.

Figure 19A:
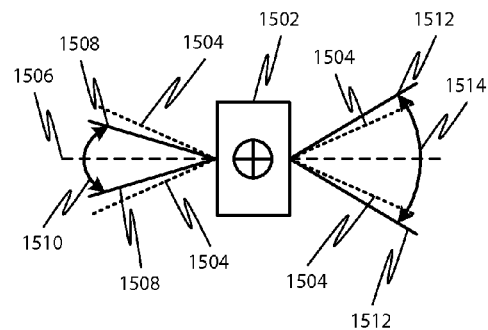
FIGS. 19A-19C are top views of changes to wing strokes to effect changes in vehicle roll, vehicle pitch, and vehicle heave, respectively in a flapping wing aerial vehicle, according to one or more embodiments of the disclosed subject matter.

Referring to FIG. 19A, control of wing stroke motion to provide roll control for an aerial vehicle 1502 is illustrated in further detail. The aerial vehicle 1502 can have original, unmodified wing stroke positions 1504 and a center stroke position 1506. By using the disclosed steering mechanisms, roll control may be achieved by altering the stroke amplitude for one of the wings with respect to the other wing. For example, for the wing on the left side of the aerial vehicle 1502, forces can be applied at end points of the stroke motion toward the center line 1506, e.g., by applying a DC voltage to the actuator coil having a same polarity as the actuator magnets, thereby moving the wing end points 1508 inward. For the wing on the right side of the aerial vehicle 1502, forces can be applied at end points of the stroke motion away from the center line 1506, e.g., by applying a DC voltage to the actuator coil having an opposite polarity as the actuator magnets, thereby moving the wing end points 1512 outward. As a result, the stroke amplitude 1510 on the left side of the aerial vehicle 1502 can be less than the stroke amplitude 1514 on the right side of the aerial vehicle 1502, which yields a change about the roll axis for the aerial vehicle 1502.

Figure 19B:
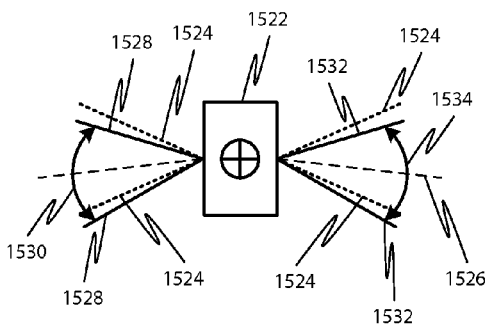

Referring to FIG. 19B, control of wing stroke motion to provide vehicle pitch control for an aerial vehicle 1522 is illustrated in further detail. The aerial vehicle 1522 can have original, unmodified wing stroke positions 1524. By using the disclosed steering mechanisms, vehicle pitch control may be achieved by displacing the stroke amplitude fore or aft for both wings. For example, for the wing on the left side of the aerial vehicle 1522, forces can be applied at end points of the stroke motion toward the front of the vehicle, e.g., by applying an appropriate AC voltage to the actuator coil, thereby moving the wing end points 1528 forward. Similarly, for the wing on the right side of the aerial vehicle 1522, forces can be applied at end points of the stroke motion toward the front of the vehicle, e.g., by applying an appropriate AC voltage to the actuator coil, thereby moving the wing end points 1532 forward. As a result, a center line 1526 of each stroke amplitude 1530, 1534 can be displaced forward, which yields a change about the vehicle pitch axis for the aerial vehicle 1522.

Figure 19C:
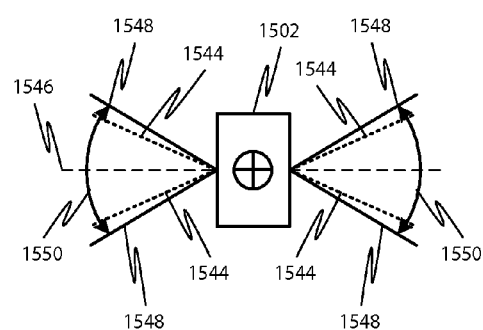

Referring to FIG. 19C, control of wing stroke motion to provide heave control for an aerial vehicle 1502 is illustrated in further detail. The aerial vehicle 1502 can have original, unmodified wing stroke positions 1544. By using the disclosed steering mechanisms, heave control may be achieved by displacing the stroke amplitude either inward or outward for both wings. For example, for the wing on the left side of the aerial vehicle 1502, forces can be applied at end points of the stroke motion away from the center line 1546, e.g., by applying a DC voltage to the actuator coil having an opposite polarity as the actuator magnets, thereby moving the wing end points 1548 outward. Similarly, for the wing on the right side of the aerial vehicle 1502, forces can be applied at end points of the stroke motion away from the center line 1546, e.g., by applying a DC voltage to the actuator coil having an opposite polarity as the actuator magnets, thereby moving the wing end points 1548 outward. As a result, the stroke amplitude 1550 on the both sides of the aerial vehicle 1502 can be increased or decreased in a similar manner, which yields a change in heave for the aerial vehicle 1502.

Figure 19D:
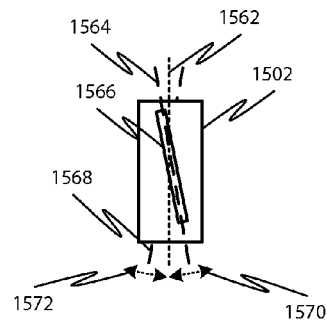
FIG. 19D is a side view of changes to stroke planes for each wing to effect changes in vehicle yaw in a flapping wing aerial vehicle, according to one or more embodiments of the disclosed subject matter.

Referring to FIG. 19D, control of wing stroke motion to provide yaw control for an aerial vehicle 1502 is illustrated in further detail. The aerial vehicle 1502 can have original, unmodified center positions 1562 (and a corresponding stroke plane perpendicular to the illustrating center position 1562). By using the disclosed steering mechanisms, yaw control may be achieved by altering the inclination of the stroke plane for one of the wings with respect to the other wing. For example, for the wing 1566 on the one side of the aerial vehicle 1502, the tunable hinge can be rotated counter clockwise, e.g., by using worm gear 1450, thereby inclining the wing plane 1564 and the stroke plane 1570 in a first direction. For the wing on the opposite side of the aerial vehicle 1502, the tunable hinge can be rotated clockwise, e.g., by using worm gear 1450, thereby inclining the wing plane 1568 and the stroke plane 1572 in a direction opposite to the first direction. The resulting change in stroke plane inclination yields a change about the yaw axis for the aerial vehicle 1502.

Alternatively or additionally, control of wing stroke motion to provide yaw control for an aerial vehicle 1502 can be achieved by displacing the stroke of each wing, similar to the control strategy illustrated in FIG. 19B, but with the strokes of the wings being displaced in opposite directions. Thus, by using the disclosed steering mechanisms, yaw control may be achieved by displacing the stroke amplitude of one wing fore and displacing the stroke amplitude of the other wing aft. For example, for the wing on the left side of the aerial vehicle 1522, forces can be applied at end points of the stroke motion toward the front of the vehicle, e.g., by applying an appropriate AC voltage to the actuator coil, thereby moving the wing end points 1528 forward, as shown in FIG. 19B. But in contrast to the configuration in FIG. 19B, for the wing on the right side of the aerial vehicle 1522, forces can be applied at end points of the stroke motion toward the rear of the vehicle, e.g., by applying an appropriate AC voltage to the actuator coil, thereby moving the wing end points 1532 aft (opposite to that shown in FIG. 19B). As a result, a center line 1526 of the stroke amplitude 1530 is displaced forward while a center line 1526 of the stroke amplitude 1534 can be displaced rearward, which yields a change about the yaw axis for the aerial vehicle 1522.

Changes in stroke end points, changes in stroke plane inclination, or a combination of changes in stroke end points and stroke plane inclination, can be used to produce changes in at least one of roll, pitch, yaw, surge, sideslip, and heave. Moreover, modifications in the stroke of the flapping wings to effect changes in at least one of roll, pitch, yaw, surge, sideslip, and heave other than those specifically described above are also possible according to one or more contemplated embodiments.

Figure 20:
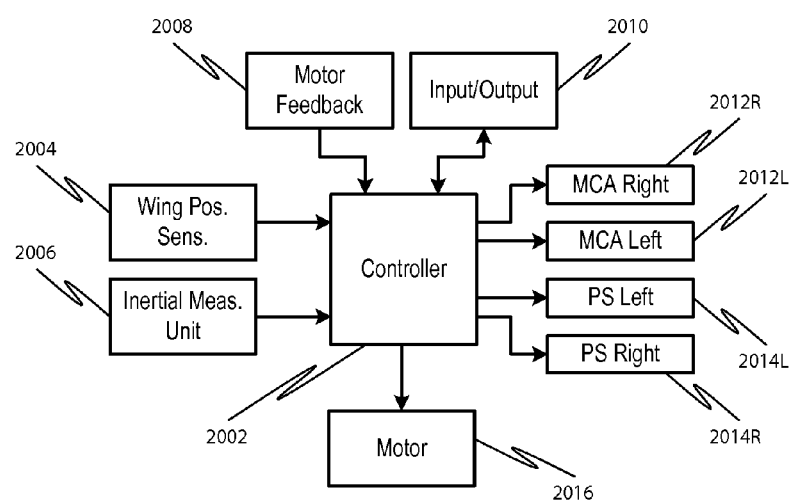
FIG. 20 is a simplified schematic diagram illustrating features of a control system for a flapping wing aerial vehicle, according to one or more embodiments of the disclosed subject matter.

Referring to FIG. 20, features of a control system for operating an aerial vehicle are illustrated in further detail. The flapping wing vehicle airframe can be dynamically unstable in hovering flight and requires feedback. Due to desired avionics weight constraints (e.g., 1 gram or less), commercially available avionics boards were unsuitable. To address this need for a lightweight feedback device, an avionics board (i.e., controller 2002) according to embodiments of the disclosed subject matter can include a processor, a multi-degree-of-freedom (multi-DOF) sensor 2006 (e.g., a six-axis inertial measurement unit (IMU) or a three-axis gyro with a three-axis accelerometer), drivers for the drive motor 2016, drivers for actuator coils 2012R, 2012L, and stroke plane actuators 2014R, 2014L. As noted above, the controller 2002 can take into account information from one or more sensors, such as wing position sensor 2004 or motor feedback 2008 to synchronize the application of forces to the wings during desired points during a stroke period.

The control system can also include (although not shown in FIG. 20) standard utility peripherals, such as a power regulator, wireless radio chip, programming interface, and diagnostic light emitting diodes (LEDs) and terminals. An I/O device 2010, similar to that discussed above, may also be provided. The weight of the control system can be on the order of 1 g, for example, 0.8 gram.

A steady-state trim command that is required by the vehicle configuration reduces the control authority available for flight control. To reduce the need for trim commands, a separate mechanical roll and pitch trim can be incorporated into the vehicle to allow flight testing. This includes a passive adjustment of the maximum achievable wing pitch and bias of maximum wing pitch between fore and aft strokes. Independent adjustment for each wing allows mechanical trim of roll, pitch and yaw.

Figure 21:
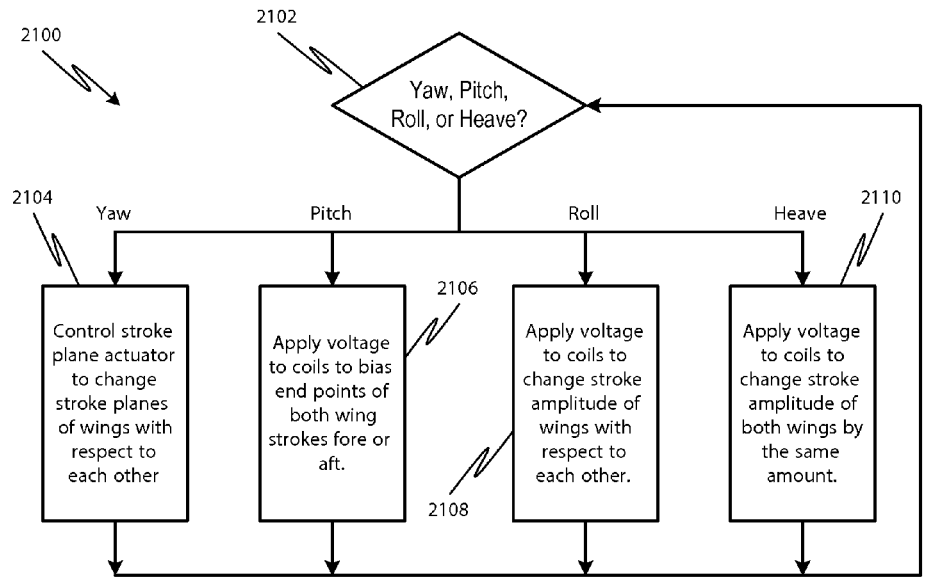
FIG. 21 is a flow diagram for a control process for a flapping wing aerial vehicle, according to one or more embodiments of the disclosed subject matter.

Referring to FIG. 21, an actuation strategy 2100 for steering control of an aerial vehicle is illustrated in further detail. At 2102, the controller can determine if a change is needed in at least one of yaw, pitch, roll or heave. If no change is needed, the controller may repeat the interrogation at regular periods (e.g., on the order of 100 Hz or faster) to account for any instability or command changes that may arise. If yaw control is desired, the control proceeds to 2104 where the stroke plane actuators are controlled to incline the stroke planes of the wings with respect to each, for example, as described above with respect to FIG. 19D. Alternatively or additionally, yaw control can be achieved by applying voltages to the actuator coils to bias end points of the stroke of one wing fore and end points of the stroke of the opposite wing aft. If pitch control is desired, the control proceeds to 2106 where voltages are applied to the actuator coils to bias end points of the strokes of both wings either fore or aft, as described above with respect to FIG. 19B. If roll control is desired, the control proceeds to 2108 where voltages are applied to the actuator coils to change the stroke amplitude of one wing with respect to the other, as described above with respect to FIG. 19A. If heave control is desired, the control proceeds to 2110 where voltages are applied to the actuator coils to change stroke amplitude of both wings by the same amount, as described above with respect to FIG. 19C. Once control is complete, the controller may repeat the interrogation at regular periods (e.g., on the order of 100 Hz or faster) to account for any instability or command changes that may arise or terminate the process (e.g., if the aerial vehicle has landed).

It is noted that the above steering control features are not mutually exclusive, and an appropriate control strategy may be accomplished by additively combining control features for yaw, pitch, roll, or heave to occur at the same time. For example, stroke plan inclinations can be made at a same time as stroke amplitude is increased for heave. Other combinations to achieve simultaneous control should be readily apparent to one of ordinary skill in the art based on the teachings of the present disclosure.

Figure 22:
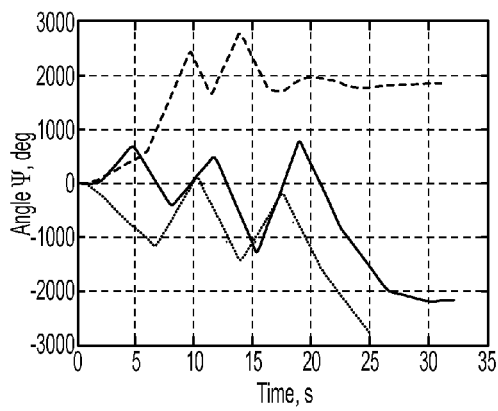
FIG. 22 is a graph showing heading angle time histories in response to a square wave command signal of a tested flapping wing aerial vehicle, according to one or more embodiments of the disclosed subject matter.
Figure 24:
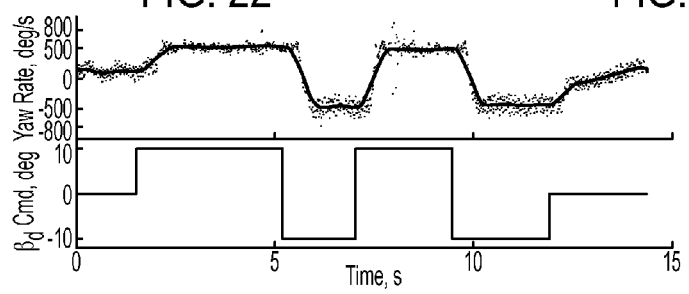
FIG. 24 is a graph showing vehicle heading rate (top) and input command (bottom) time histories for a tested flapping wing aerial vehicle, according to one or more embodiments of the disclosed subject matter.

Examples of a flapping wing aerial vehicle according to one or more embodiments of the disclosed subject matter were subjected to testing to evaluate flight control and stability characteristics. In the experiments, retro-reflective tracking markers were affixed to the aerial vehicle and the vehicle's position and orientation tracked with a Vicon motion capture system. Step commands were repeated for both one and both wings to determine the peak rotation rate, and the vehicle's heading angle digitized at 50 Hz. Time histories of the heading angle for several test cases are shown in FIG. 22, which shows that the vehicle is rotating through multiple rotations in either direction. A comparison of the commanded input stroke inclination $\beta_d$ and the heading rate r in FIG. 24 shows that the vehicle can regularly achieve 500°/s rotation rates. Data was also collected of the response to a single wing actuator input the degree of freedom, which showed a peak rotation rate of 332°/s, indicating that the vehicle has some robustness to actuator failure.

Using square wave response data like that in FIGS. 22 and 24, an identification of the yaw dynamics is possible. It may be desirable to model the bare airframe yaw dynamics from stroke plane inclination to heading rate as a first order system to allow direct comparison to previous unmanned rotorcraft system models and full scale rotorcraft:

$$\frac{r}{\delta_\beta} \approx P_1(s) = \frac{N_{\beta_d}}{s - N_r}, \quad (1)$$

or in state space form, $$\dot{r} = N_r r + N_\beta \beta \quad (2)$$

where r is vehicle yaw rate and $N_{\beta_d}$, $N_r$ are yaw damping and yaw control power, respectively. Both time and frequency domain methods were used to identify the parameters $N_{\beta_d}$, $N_r$. A delay model was included to account for actuator dynamics:

$$\frac{r}{\delta_\beta} \approx P_2(s) = \frac{N_{\beta_d}}{s - N_r} e^{-s\tau} \quad (3)$$

which resulted in small improvements to the identification quality.

Figure 28:
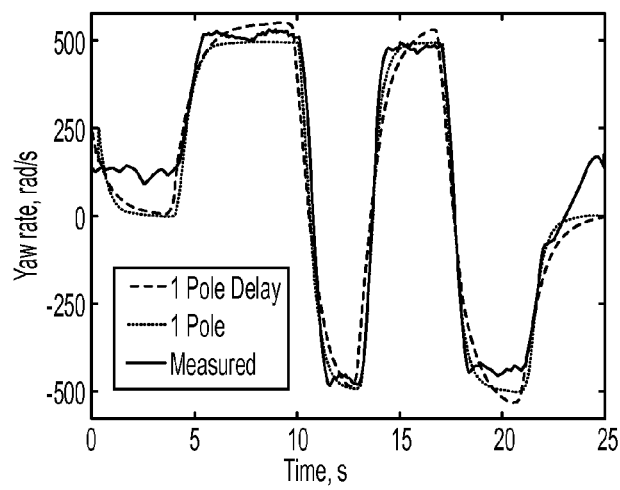
FIG. 28 is graph of measured and modeled vehicle heading rate time histories for a tested flapping wing aerial vehicle, according to one or more embodiments of the disclosed subject matter.

The model performance is shown in FIG. 28, using the parameters in Tables 1 and 2. The simulated model shows excellent agreement for all but the initial spin-up during which the vehicle experiences an uncommanded rotation. The initial rotation during spin-up may be a motor torque reaction while the wings are flapping too slowly to be aerodynamically effective. One potential source of error in the rotational measurements is damping provided by the test stand. To estimate the effects of bearing drag on the dynamics measurements, the vehicle's response to an initial yaw velocity was compared with the vehicle both static and flapping. In all cases, this comparison indicated that damping provided by the stand was less than 10% of the accelerations due to aerodynamic control moments, and was neglected in further analysis.

TABLE 1

Parameters in yaw dynamics model $P_1(s)$, from $\beta_d$ (rad) to r (rad/s).

| Parameter | Label | Value |
| --- | --- | --- |
| Control Power | $N_{\beta_d}$ | 54.7 |
| Pole Location | $N_r$ | −1.14 |

TABLE 2

Parameters in yaw dynamics model $P_2(s)$, from $\beta_d$ (rad) to r (rad/s).

| Parameter | Label | Value |
| --- | --- | --- |
| Control Power | $N_{\beta_d}$ | 49.4 |
| Pole Location | $N_r$ | −2.5 |
| Time Constant | $\tau$ | 0.371 |

Figure 23:
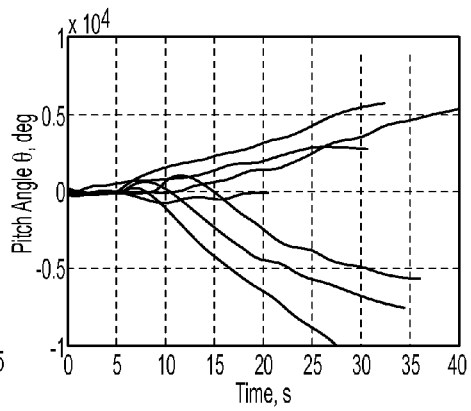
FIG. 23 is a graph showing pitch angle time histories of a tested flapping wing aerial vehicle, according to one or more embodiments of the disclosed subject matter.

Examples of a flapping wing aerial vehicle according to one or more embodiments of the disclosed subject matter were subjected to further testing to evaluate flight control and stability characteristics, in particular, in response to pitch and roll inputs. In the experiments, the aerial vehicle was again tracked with a Vicon motion capture system while pitch and roll inputs were applied. Both automated and manually-generated step commands were applied to the pitch and roll axes, and the vehicle's pitch and roll angles digitized at 100 Hz. The vehicle was tethered to rotation about either the pitch or roll axis. After calibration, the onboard rate measurements showed agreement with the visual tracking system, as seen in FIG. 27. Time histories of the (unwrapped) pitch angle for numerous test cases are shown in FIG. 23, which shows that the vehicle is rotating through multiple rotations in either direction. A comparison of vehicles input commands and outputs in FIGS. 25-26 shows that the vehicle can regularly achieve 200°/s rotation rates about both the pitch and roll axes.

Figure 25:
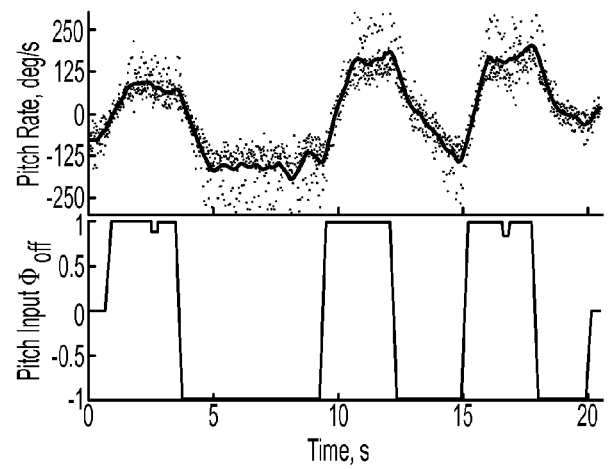
FIG. 25 is a graph showing vehicle pitch rate (top) and input command (bottom) time histories for a tested flapping wing aerial vehicle, according to one or more embodiments of the disclosed subject matter.
Figure 26:
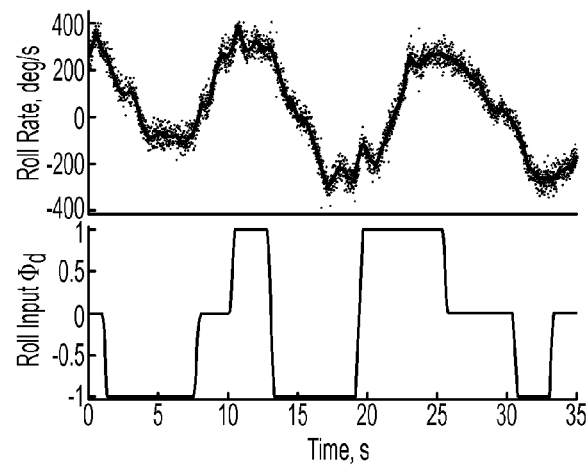
FIG. 26 is a graph showing vehicle roll rate (top) and input command (bottom) time histories for a tested flapping wing aerial vehicle, according to one or more embodiments of the disclosed subject matter.
Figure 27:
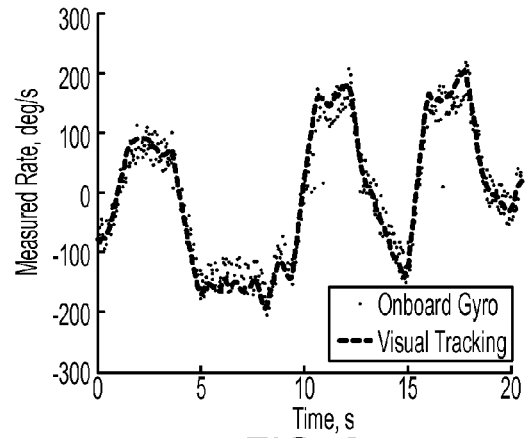
FIG. 27 is a graph comparing onboard measurements of angular rates (onboard gyro) to external measurements via visual tracking of a tested flapping wing aerial vehicle, according to one or more embodiments of the disclosed subject matter.

Using square wave response data like that in FIGS. 25-26, an identification of the underlying pitch and roll dynamics is possible. It is desirable to model the bare airframe yaw dynamics from pitch command (stroke bias) to pitch rate and roll command (differential stroke amplitude) to roll rate as first order systems to allow direct comparison to previous unmanned rotorcraft system models and full scale rotorcraft. Time domain system identification was conducted using recorded pitch command inputs and resulting pitch rate while the vehicle operated at a constant throttle command. A first order linear transfer function model P(s) both with and without an additional delay model $e^{-\tau s}$ was used, of the form:

$$P(s) = \frac{M_{\delta_e}}{s - M_q}, \quad P_d(s) = \frac{M_{\delta_e}}{s - M_q} e^{-s\tau} \qquad (4)$$

where $M_{\delta_e}$ quantifies the control power, $-M_q$ the pole, and $\tau$ the delay.

Figure 29:
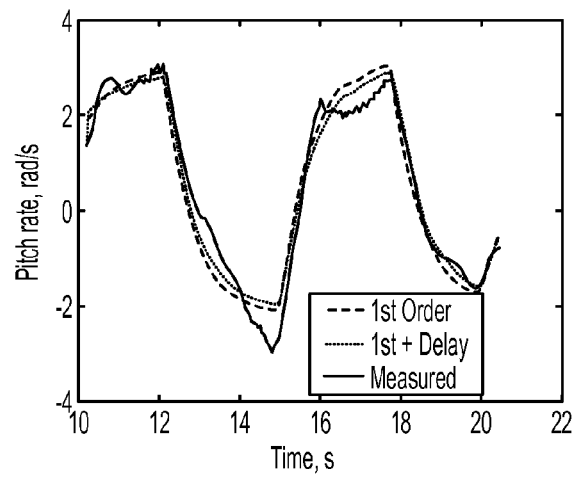
FIG. 29 is a graph of measured and modeled vehicle pitch rate time histories for a tested flapping wing aerial vehicle, according to one or more embodiments of the disclosed subject matter.

Without a delay model, the system parameters and an estimate of their uncertainties are shown in Table 3. When a delay model is included, the system parameters are changed only slightly as seen in Table 4, and the large uncertainty on the delay $\tau$ suggests that the underlying dynamics do not contain a significant delay of this form. A comparison of simulated validation trajectories as seen in FIG. 29 confirms that the delay model is unnecessary.

TABLE 3

Parameters in pitch dynamics model P (s).

| Parameter | Label | Value | Uncertainty |
| --- | --- | --- | --- |
| Control Power | $K_{\delta_e}$ | 2.6236 | ±0.046 |
| Pole Location | $M_q$ | −1.52 | ±0.166 |

TABLE 4

Parameters in pitch dynamics model $P_d$(s).

| Parameter | Label | Value | Uncertainty |
| --- | --- | --- | --- |
| Control Power | $K_{\delta_e}$ | 2.54 | ±0.048 |
| Pole Location | $M_q$ | −1.34 | ±0.122 |
| Time constant | $\tau$ | 109s | ±65.7 |

Figure 30:
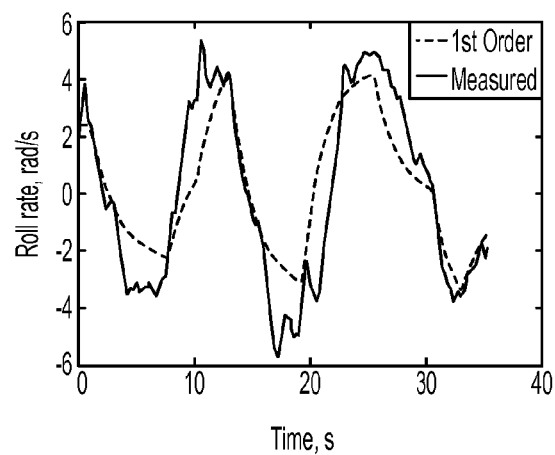
FIG. 30 is a graph of measured and modeled vehicle roll rate time histories for a tested flapping wing aerial vehicle, according to one or more embodiments of the disclosed subject matter.

Since roll command actuation response proved more sensitive to voltage variations, the identification procedure was modified to cross validate identifications made during a high voltage test against data taken later from a partially-discharged battery. The roll dynamics continued to show complexity beyond what a first order linear model would capture, as seen in FIG. 30. First order roll dynamic parameters were $-0.17$ s$^{-1}$ for $L_P$ and 20.9 rad/s$^2$/in for $L_\delta$.

Embodiments of the disclosed subject matter may be particularly relevant to micro-aerial vehicles, e.g., aerial vehicles having a size less than 15 g overall (exclusive of the weight of any utility payload, e.g., a camera or other sensor). However, advantages of the disclosed subject matter are not limited thereto. Indeed, the teachings may be applicable to macro-aerial vehicles, and such macro-aerial vehicle embodiments constitute part of the disclosed subject matter.

Applications for embodiments of the disclosed subject matter include, but are not limited to:

Surveillance by military or law-enforcement. For example, the disclosed aerial vehicle can carry a sensor platform to enable "fly-on-the-wall" reconnaissance. For example, the sensor platform can include imaging devices (e.g., cameras), audio devices (e.g., microphones), or any other sensors (e.g., IR sensors, chemical sensors, proximity sensors, etc.).

Environmentally-camouflaged micro-aerial vehicles (MAVs) designed to resemble insects.

Discrete audio or video recording, for example, for film production or reporting on events by journalists.

Amusement, such as toy-version remote-controlled models.

Rapid exploration and mapping of indoor and/or outdoor spaces, such as cavities or caves, or in rescue operations, such as hostage situations, fires, or building collapse.

Herding of animals having economic value (e.g., schools of fish, migratory pests) via biological mimicry as an insect.

Control of invasive species via reduction of breeding opportunities for insects.

Crop pollination in areas where pollination by natural species is declining or prohibitive.

Wireless communications network, by acting as temporary relays for communication signals.

Other applications for embodiments of the disclosed subject matter beyond those listed above would be readily apparent to one of ordinary skill in the art.

Although embodiments have been specifically described above with respect to a vehicle having a pair of flapping wings, embodiments of the disclosed subject matter are not limited thereto. Indeed, it is also contemplated that an aerial vehicle may have more than two flapping wings, for example, multiple pairs of flapping wings. For example, an aerial vehicle can have four wings, with two wings on each side of the vehicle. Lift generating and steering control for the multiple pairs of flapping wings may operate in a similar manner as to the two-wing embodiments described above. Alternatively or additionally, one pair of wings can operate in primarily lift-generating mode (i.e., without any steering control) while a second pair of wings can provide both lift-generating and steering aspects. Various other combinations of the disclosed features will be readily apparent to those of skill in the art and constitute part of the disclosed subject matter.

In one or more embodiments of the disclosed subject matter, non-transitory computer-readable storage media and a computer processing systems can be provided. In one or more embodiments of the disclosed subject matter, non-transitory computer-readable storage media can be embodied with a sequence of programmed instructions for controlling the flapping wings of the flying robot, the sequence of programmed instructions embodied on the computer-readable storage medium causing the computer processing systems to perform one or more of the disclosed methods.

It will be appreciated that the modules, processes, systems, and devices described above can be implemented in hardware, hardware programmed by software, software instruction stored on a non-transitory computer readable medium or a combination of the above. For example, a method for controlling the flapping wings of an aerial vehicle can be implemented, for example, using a processor configured to execute a sequence of programmed instructions stored on a non-transitory computer readable medium. For example, the processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like. Furthermore, the modules, processes, systems, and devices can be implemented as a single processor or as a distributed processor. Further, it should be appreciated that the steps mentioned herein may be performed on a single or distributed processor (single and/or multi-core). Also, the processes, modules, and sub-modules described in the various figures of and for embodiments herein may be distributed across multiple computers or systems or may be co-located in a single processor or system. Exemplary structural embodiment alternatives suitable for implementing the modules, sections, systems, means, or processes described herein are provided below.

The modules, processes, systems, and devices described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the methods, processes, modules, devices, and systems (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the methods, systems, or computer program products (software program stored on a non-transitory computer readable medium).

Furthermore, embodiments of the disclosed methods, processes, modules, devices, systems, and computer program product may be readily implemented, fully or partially, in software using, for example, object or object-oriented software development environments that provide portable source code that can be used on a variety of computer platforms. Alternatively, embodiments of the disclosed methods, processes, modules, devices, systems, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the methods, processes, modules, devices, systems, and computer program product can be implemented in hardware and/or software using any known or later developed systems or structures, devices and/or software by those of ordinary skill in the applicable art from the function description provided herein and with a general basic knowledge of control systems and/or computer programming arts.

In this application, unless specifically stated otherwise, the use of the singular includes the plural and the use of "or" means "and/or." Furthermore, use of the terms "including" or "having," as well as other forms, such as "includes," "included," "has," or "had" is not limiting. Any range described herein will be understood to include the endpoints and all values between the endpoints.

Features of the disclosed embodiments may be combined, rearranged, omitted, etc., within the scope of the invention to produce additional embodiments. Furthermore, certain features may sometimes be used to advantage without a corresponding use of other features.

It is thus apparent that there is provided in accordance with the present disclosure, flapping wing aerial vehicles. Many alternatives, modifications, and variations are enabled by the present disclosure. While specific embodiments have been shown and described in detail to illustrate the application of the principles of the present invention, it will be understood that the invention may be embodied otherwise without departing from such principles. Accordingly, Applicants intend to embrace all such alternatives, modifications, equivalents, and variations that are within the spirit and scope of the present invention.

The invention claimed is:

1. A flapping wing aerial vehicle comprising:
 a vehicle body;
 a pair of flapping wings;
 tunable wing hinges coupled to the flapping wings, each wing hinge constructed to deliver a force to a respective one of the flapping wings to alter end points of a stroke of the respective flapping wing;
 a motor;
 a power transmission device; and
 elastic drive mechanisms that rotate the flapping wings about pivot points to produce the strokes of the flapping wings,
 wherein each tunable wing hinge includes an actuator magnet coupled to a drive portion of the respective flapping wing and an actuator coil that applies a magnetic force to the actuator magnet to alter the end points of the flapping wing stroke,
 wherein each elastic drive mechanism comprises a nonlinear spring element coupling a drive portion of the respective flapping wing to a rigid drive arm, and
 wherein the power transmission device couples the motor to the rigid drive arm of each elastic drive mechanism and converts rotational motion of the motor into linear motion at each rigid drive arm.

2. The flapping wing aerial vehicle of claim 1, further comprising rotational drives that rotate the wing hinges about a first axis perpendicular to a direction of the flapping so as to change an inclination of a plane of the stroke of the flapping wing.

3. The flapping wing aerial vehicle of claim 2, further comprising a controller configured to control the tunable wing hinges to alter the end points or the inclination planes of the flapping wing strokes to produce changes in at least one of roll, pitch, yaw, surge, sideslip, and heave.

4. The flapping wing aerial vehicle of claim 1, wherein a magnetic field of the actuator magnet is parallel to a magnetic field of the respective actuator coil when the respective flapping wing is at a center of the stroke of the flapping wing.

5. The flapping wing aerial vehicle of claim 1,
 wherein the nonlinear spring element has a first stiffness when the respective flapping wing is at a center of the stroke of the flapping wing,
 wherein the nonlinear spring element has a second stiffness when the respective flapping wing is at either of the end points of the stroke of the flapping wing, and
 wherein the first stiffness is greater than the second stiffness.

6. The flapping wing aerial vehicle of claim 1, wherein the nonlinear spring element comprises a torsion spring or a cantilever spring.

7. The flapping wing aerial vehicle of claim 1, wherein the power transmission device comprises a Cardan drive mechanism.

8. The flapping wing aerial vehicle of claim 1,
wherein the power transmission device comprises a gear train and a crank arm, and
wherein one end of the crank arm is coupled to the gear train and an opposite end of the crank arm is coupled to each of the drive arms.

9. The flapping wing aerial vehicle of claim 1, further comprising a controller configured to control a speed of the motor to drive each of the elastic drive mechanisms at a frequency within a range from 10% below their resonance frequency to 1% above their resonance frequency.

10. The flapping wing aerial vehicle of claim 9, wherein a root portion of each of the flapping wings comprises a root spring element, and the controller is configured to control a speed of the motor to drive the flapping wings at a frequency within 5% of their resonance frequency.

11. The flapping wing aerial vehicle of claim 9, further comprising a sensor that measures angular rate of the aerial vehicle, wherein the controller is configured to control actuation of the flapping wings through the tunable wing hinges and the elastic drive mechanisms so as to cause a change in at least one of yaw rate, roll rate, and pitch rate.

12. A flapping wing aerial vehicle comprising:
a vehicle body;
a pair of flapping wings;
tunable wing hinges coupled to the flapping wings, each wing hinge constructed to deliver a force to a respective one of the flapping wings to alter end points of a stroke of the respective flapping wing;
a motor;
a power transmission device; and
elastic drive mechanisms that rotate the flapping wings about pivot points to produce the strokes of the flapping wings,
wherein each tunable wing hinge includes an actuator magnet coupled to a drive portion of the respective flapping wing and an actuator coil that applies a magnetic force to the actuator magnet to alter the end points of the flapping wing stroke,
wherein each elastic drive mechanism comprises a nonlinear spring element coupling a drive portion of the respective flapping wing to a rigid drive arm,
wherein the power transmission device couples the motor to the rigid drive arm of each elastic drive mechanism and converts rotational motion of the motor into linear motion at each rigid drive arm, and
wherein each of the flapping wings comprises a dihedral angle and a root spring element having vertical flexibility.

13. The flapping wing aerial vehicle of claim 12, wherein the dihedral angle and the vertical flexibility of the root spring allow a membrane of the flapping wing to deform throughout the stroke, such that a pitch of the flapping wing relative to a plane of the stroke passively changes.

14. The flapping wing aerial vehicle of claim 12, wherein, for each of the flapping wings, the stroke is along a horizontal direction so as to generate lift in a vertical direction parallel to gravity.

15. The flapping wing aerial vehicle of claim 14, wherein, for each of the flapping wings, a location in the vertical direction of a wing tip of the respective flapping wing changes as the respective flapping wing moves through the stroke along the horizontal direction.

16. The flapping wing aerial vehicle of claim 15, wherein as the respective flapping wing moves through the stroke the wing tip of the flapping wing follows a figure-8 pattern.

17. The flapping wing aerial vehicle of claim 6,
wherein the cantilever spring comprises a variable length cantilever having a first length at a center of the stroke of the flapping wing and a second length at either end point of the stroke of the flapping wing, and
wherein the second length is greater than the first length.

18. The flapping wing aerial vehicle of claim 6,
wherein the torsion spring has a first end coupled to the drive arm and a second end coupled to the drive portion of the flapping wing,
wherein the drive arm drives the torsion spring back and forth along a length of the torsion spring,
wherein, when the flapping wing is at a center of the stroke, motion of the drive portion is parallel to the length of the torsion spring, so as to provide a first stiffness,
wherein, when the flapping wing is at either of the end points of the stroke, motion of the drive portion is perpendicular to the length of the torsion spring, so as to provide a second stiffness, and
wherein the first stiffness is greater than the second stiffness.

19. The flapping wing aerial vehicle of claim 1, wherein, for each of the flapping wings, the stroke is along a horizontal direction so as to generate lift in a vertical direction parallel to gravity.

20. The flapping wing aerial vehicle of claim 1, further comprising a controller configured to control end points of the strokes of the flapping wings via the tunable wing hinges and the elastic drive mechanisms so as to cause a change in at least one of yaw rate, roll rate, and pitch rate.

* * * * *